US012650898B2

(12) United States Patent (10) Patent No.: US 12,650,898 B2
Na et al. (45) Date of Patent: Jun. 9, 2026

(54) OPERATION METHOD OF MEMORY CONTROLLER CONFIGURED TO CONTROL MEMORY DEVICE

(71) Applicant: SAMSUNG ELECTRONICS CO., LTD., Suwon-si (KR)

(72) Inventors: Jong-Sung Na, Suwon-si (KR); Sohyun Han, Suwon-si (KR); Seona Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 18/386,656

(22) Filed: Nov. 3, 2023

(65) Prior Publication Data

US 2024/0193041 A1 Jun. 13, 2024

(30) Foreign Application Priority Data

Dec. 13, 2022 (KR) ........................ 10-2022-0174036

(51) Int. Cl.
*G06F 11/10* (2006.01)

(52) U.S. Cl.
CPC ...... *G06F 11/1068* (2013.01); *G06F 11/1016* (2013.01); *G06F 11/102* (2013.01)

(58) Field of Classification Search
CPC .............. G06F 11/1068; G06F 11/102; G06F 11/1016; G06F 11/1048; G06F 3/0619; G06F 3/0658; G06F 3/0688; G06F 11/1044; G06F 11/076; G06F 12/1009; G11C 29/44

USPC ......................................... 714/764
See application file for complete search history.

(56) References Cited

U.S. PATENT DOCUMENTS

| | | | |
|---|---|---|---|
| 1,001,932 A * | 8/1911 | Corey ..................... H01H 7/00 | |
| | | | 200/DIG. 30 |
| 6,560,725 B1 * | 5/2003 | Longwell ............ G06F 11/0772 | |
| | | | 714/763 |
| 9,626,242 B2 | 4/2017 | Healy et al. | |
| 10,019,312 B2 | 7/2018 | Healy et al. | |
| 10,063,263 B2 | 8/2018 | Healy et al. | |
| 11,074,127 B1 | 7/2021 | Cha et al. | |
| 11,163,640 B2 | 11/2021 | Eun et al. | |
| 11,301,317 B2 | 4/2022 | Kim et al. | |
| 11,392,454 B2 | 7/2022 | Kim et al. | |

(Continued)

FOREIGN PATENT DOCUMENTS

| | | |
|---|---|---|
| JP | 2012-230730 A | 11/2012 |
| KR | 10-2021-0138241 A | 11/2021 |
| KR | 10-2022-0060156 A | 5/2022 |

*Primary Examiner* — Esaw T Abraham
*Assistant Examiner* — Enam Ahmed
(74) *Attorney, Agent, or Firm* — Sughrue Mion, PLLC

(57) ABSTRACT

Disclosed is an operation method of a memory controller controlling a memory device. The operation method includes loading raw data from the memory device, performing a 0th error correction operation on the raw data, generating first flip data by performing a first bit flip operation on the raw data based on a correction history table, when an error of the raw data is not corrected through the 0th error correction operation, and performing a first error correction operation on the first flip data, and the correction history table includes correction addresses indicating locations of one or more memory cells in the memory device, which are associated with previously corrected error bits.

20 Claims, 21 Drawing Sheets

(56)     References Cited

U.S. PATENT DOCUMENTS

| | | | | |
|---|---|---|---|---|
| 11,775,383 B2 * | 10/2023 | Fackenthal | ......... | G06F 11/1076 |
| | | | | 714/764 |
| 2004/0123213 A1 | 6/2004 | Welbon et al. | | |
| 2013/0013977 A1 * | 1/2013 | Rivers | .................... | G11C 29/52 |
| | | | | 714/763 |
| 2015/0309872 A1 * | 10/2015 | Cai | .................... | G06F 11/1076 |
| | | | | 714/764 |
| 2017/0235632 A1 * | 8/2017 | Healy | ................. | G06F 11/1024 |
| | | | | 714/764 |
| 2019/0196902 A1 * | 6/2019 | Lee | ......................... | G11C 29/52 |
| 2019/0198114 A1 * | 6/2019 | Ben-Rubi | .......... | G11C 16/3459 |
| 2021/0049068 A1 * | 2/2021 | Schaefer | ............. | G06F 11/1076 |
| 2021/0265002 A1 * | 8/2021 | Noguchi | ................ | G11C 29/42 |
| 2021/0286601 A1 * | 9/2021 | Fitzsimons | ............... | G06F 8/72 |
| 2022/0139462 A1 * | 5/2022 | Du | ........................... | G11C 7/12 |
| | | | | 365/228 |
| 2022/0139482 A1 | 5/2022 | Kim et al. | | |
| 2022/0147267 A1 * | 5/2022 | Rooney | ................. | G11C 29/76 |
| 2022/0229726 A1 | 7/2022 | Doh et al. | | |
| 2022/0270701 A1 * | 8/2022 | Noguchi | ................ | G11C 29/44 |
| 2023/0325276 A1 * | 10/2023 | Li | ........................ | G06F 11/0793 |
| | | | | 714/764 |
| 2024/0105276 A1 * | 3/2024 | Duryea | ................. | G11C 29/52 |

* cited by examiner

FIG. 6

CHT

| Correction Address (ADDR_COR) | |
|---|---|
| Row | Column |
| R01 | C02 |
| | C04 |
| | C16 |
| | C23 |
| R05 | C03 |
| | C11 |
| R13 | C01 |

FIG. 7C

DT_RAW  SF: F
[2b ERR]

DT_F3  SF: S
[1b ERR]

R01/C08

R01/C16

Bit Flip

Correction Address
(ADDR_COR)

| Row | Column |
|-----|--------|
|     | C02 |
| R01 | C04 |
|     | C16 |
|     | C23 |
| R05 | C03 |
|     | C11 |
| R13 | C01 |
| R01 | C08 |

FIG. 8

CHT-1

| Correction Address (ADDR_COR) | | Count |
|---|---|---|
| Row | Column | |
| R01 | C02 | 1 |
| | C04 | 17 |
| | C16 | 36 |
| | C23 | 5 |
| R05 | C03 | 14 |
| | C11 | 1 |
| R13 | C01 | 45 |

FIG. 10

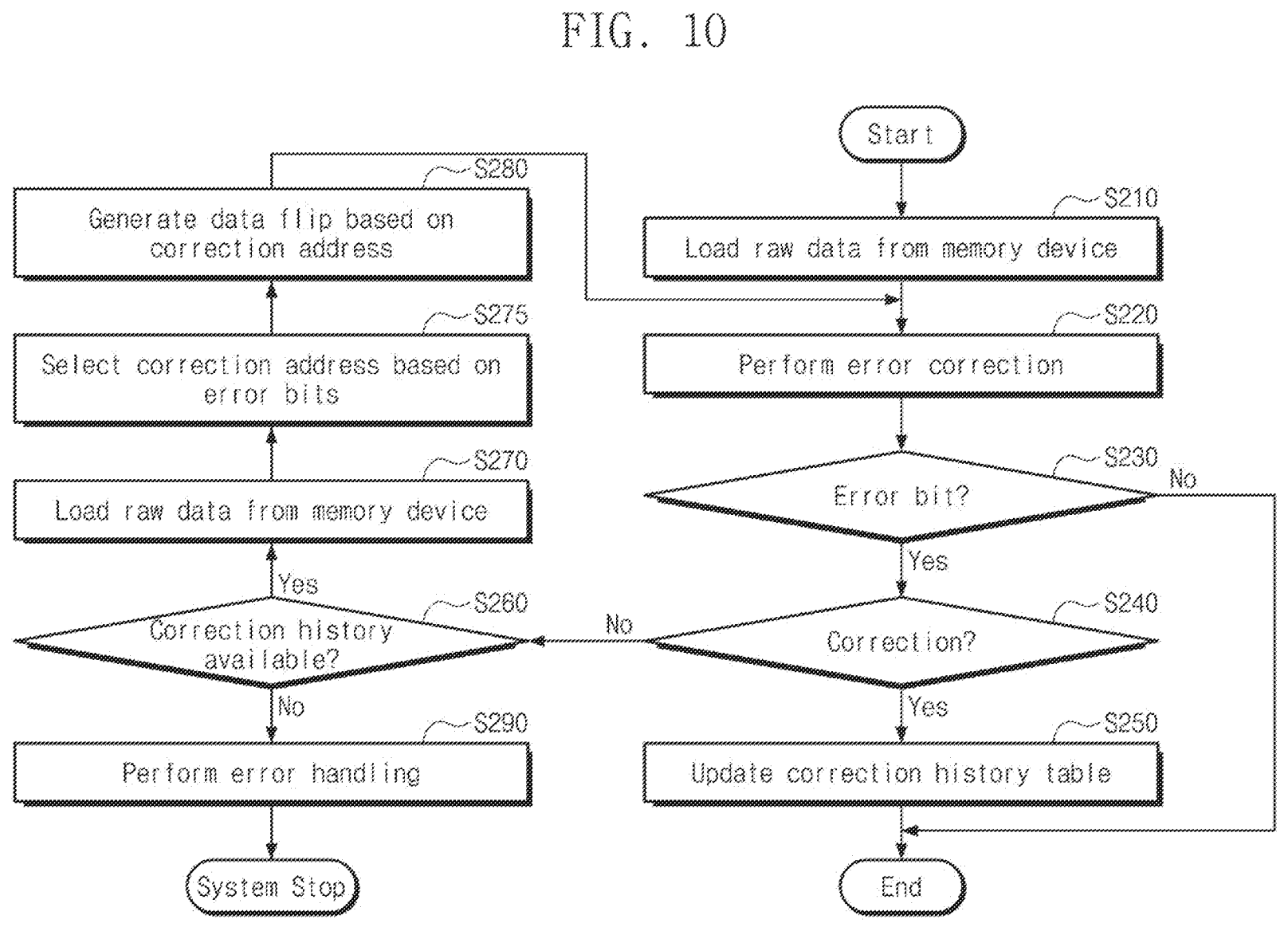

Start

S210 — Load raw data from memory device

S220 — Perform error correction

S230 — Error bit?

No → (loop back)

Yes

S240 — Correction?

Yes

S250 — Update correction history table

End

No →

S260 — Correction history available?

Yes

S270 — Load raw data from memory device

S275 — Select correction address based on error bits

S280 — Generate data flip based on correction address

No →

S290 — Perform error handling

System Stop

FIG. 19

OPERATION METHOD OF MEMORY CONTROLLER CONFIGURED TO CONTROL MEMORY DEVICE

CROSS-REFERENCE TO RELATED APPLICATIONS

This application is based on and claims priority under 35 U.S.C. § 119 to Korean Patent Application No. 10-2022-0174036 filed on Dec. 13, 2022, in the Korean Intellectual Property Office, the disclosures of which are incorporated by reference herein in their entireties.

BACKGROUND

1. Field

Embodiments of the disclosure relate to a semiconductor memory, and more particularly, to a memory controller configured to control a memory device and an operation method of the memory controller.

2. Description of Related Art

A semiconductor memory is classified as a volatile memory or a nonvolatile memory. The volatile memory is a memory, in which, stored data disappear (i.e., erased permanently) when a power is turned off, such as a static random access memory (SRAM) or a dynamic random access memory (DRAM) and a nonvolatile memory is memory, in which, stored data are retained even when a power is turned off, such as a flash memory device, a phase-change RAM (PRAM), a magnetic RAM (MRAM), a resistive RAM (RRAM), or a ferroelectric RAM (FRAM).

A DRAM device is widely used as a system memory, a working memory, or a buffer memory in various systems. The DRAM device stores data by charging charges in a storage capacitor included in a memory cell or discharging charges from the storage capacitor. However, during an operation of the DRAM device, the data stored in memory cells may be lost, in which case, the reliability of the DRAM device may be reduced.

SUMMARY

Embodiments of the disclosure provide a memory controller configured to control a memory device and an operation method of the memory controller with improved reliability.

According to an aspect of the disclosure, there is provided a method of operating a memory controller configured to control a memory device, the method including: loading data from the memory device; performing a first error correction operation on the data; based on an error in the data not being corrected through the first error correction operation, generating first flip data by performing a first bit flip operation on the data based on a correction history information; and performing a second error correction operation on the first flip data, wherein the correction history information comprises one or more correction addresses indicating locations of one or more memory cells in the memory device, which are associated with previously corrected error bits.

According to another aspect of the disclosure, there is provided a method of operating a memory controller configured to control a memory device, the method including: loading first data from the memory device; performing a first error correction operation on the first data; updating a correction history information based on a first address corresponding to an error bit corrected in the first data; loading second data having a row address identical to a row address of the first data from the memory device; performing a second error correction operation on the second data; based on an error of the second data not being corrected, generating first flip data by flipping a bit of the second raw data, which corresponds to the first address, based on the correction history information; and performing a second error correction operation on the first flip data.

According to another aspect of the disclosure, there is provided a method of operating a memory controller configured to control a memory device, the method including: loading data from the memory device; performing a first error correction operation on the data; based on an error in the data not being corrected through the first error correction operation, generating first flip data by flipping at least one first bit among a plurality of bits of the data; and performing a second error correction operation on the first flip data.

BRIEF DESCRIPTION OF DRAWING

The above and other objects and features of the disclosure will become apparent by describing in detail embodiments thereof with reference to the accompanying drawings.

FIG. 6 is a diagram for describing a correction history table of FIG. 4.

FIGS. 7A to 7C are diagrams for describing an operation of a memory controller of FIG. 1.

FIG. 8 is a diagram illustrating a correction history table of FIG. 4.

FIG. 10 is a flowchart illustrating an operation of a memory controller of FIG. 1.

FIG. 19 is a block diagram illustrating a host-storage system according to an embodiment of the disclosure.

DETAILED DESCRIPTION

Figure 1:
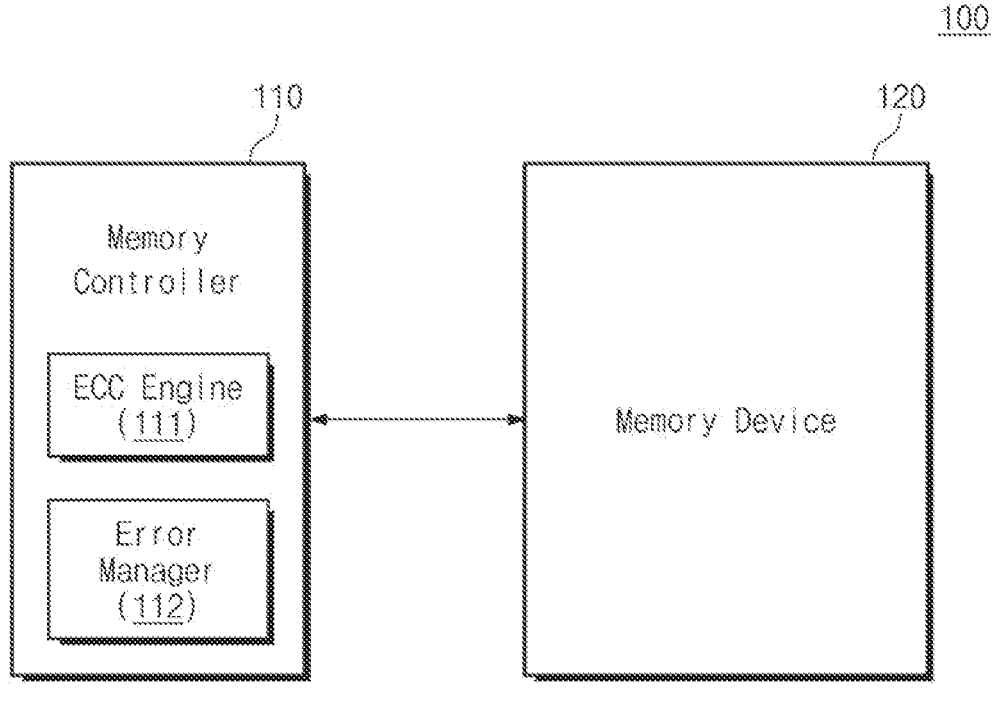
FIG. 1 is a block diagram illustrating a memory system according to an embodiment of the disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. As used herein, expressions such as "at least one of" when preceding a list of elements, modify the entire list of elements and do not modify the individual elements of the list. For example, the expression, "at least one of a, b, and c" should be understood as including only a, only b, only c, both a and b, both a and c, both b and c, or all of a, b, and c.

Unless otherwise defined, all terms including technical or scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

FIG. 1 is a block diagram illustrating a memory system according to an embodiment of the disclosure. Referring to FIG. 1, a memory system 100 may include a memory controller 110 and a memory device 120. In an embodiment, the memory system 100 may be included in user devices such as a personal computer, a laptop computer, a server, a media player, a digital camera, or automotive devices such as a navigation system, a black box, and an automotive electronic device/part. According to another embodiment, the memory system 100 may be a mobile system such as a mobile phone, a smartphone, a tablet personal memory (PC), a wearable device, a health care device, or an Internet of things (IoT) device. According to an embodiment, the memory system 100 may be included in a storage system such as a solid state drive.

The memory controller 110 may be configured to control the memory device 120. For example, the memory controller 110 may store data in the memory device 120 or may read data stored in the memory device 120. For example, the memory controller 110 may perform a write operation to store data in the memory device 120 or may perform a read operation to read data stored in the memory device 120. In an embodiment, the memory controller 110 and the memory device 120 may communicate with each other based on a given interface. In an embodiment, the memory controller 110 and the memory device 120 may communicate with each other based on the (double-data-rate) DDR interface or the Low-Power Double Data Rate (LPDDR) interface, but the disclosure is not limited thereto. As such, according to another embodiment, the memory controller 110 and the memory device 120 may communicate with each other using another type of communication interface.

Under control of the memory controller 110, the memory device 120 may store data or may provide data stored in the memory device 120 to the memory controller 110. In an embodiment, the memory device 120 may be a dynamic random access memory (DRAM), but the disclosure is not limited thereto. For example, the memory device 120 may include a volatile memory such as an SRAM or a nonvolatile memory such as a PRAM and/or an RRAM.

In an embodiment, the memory controller 110 may include an error correction code (ECC) engine 111 and an error manager 112. For example, the data stored in the memory device 120 may include an error that is caused due to various factors. The ECC engine 111 may generate parity data associated with user data to be stored in the memory device 120 and may store the parity data and the user data in the memory device 120 together. Although the disclosure describes user data according to an example embodiment, the disclosure is not limited to "user data", and as such, the data stored in the memory device is not limited to user data. For instance, the data to be stored in the memory device 120 may include other types of data (i.e., device data, sensor data etc.) The ECC engine 111 may read the user data and the parity data stored in the memory device 120, may detect an error included in the user data by using the parity data, and may correct the error.

In an embodiment, the ECC engine 111 may correct an error bit of the user data. For example, the ECC engine 111 may correct one or more error bits. Here, a number of the one or more error bits is smaller than or equal to a given level (hereinafter referred to as an "error correction level"). Here, the error correction level may also be referred to an error correction value or an error correction amount. When the number of error bits included in the user data exceeds the error correction level, the ECC engine 111 may fail to correct the error bits of the user data. When the error bits of the user data are incapable of being corrected by the ECC engine 111, the memory system 100 may be interrupted or memory system 100 may enter a system fault. In this case, the normal operation of the memory system 100 may be impossible.

According to embodiments of the disclosure, when the error bits of the user data are incapable of being corrected by the ECC engine 111, the error manager 112 may generate flip data by performing a bit flip operation on the user data. The bit flip operation refers to an operation of flipping at least one of bits included in the user data (e.g., from "0" to "1" or from "1" to "0"). That is, when a specific bit of the user data is an error bit, the specific bit may be changed to a normal bit by performing the bit flip operation on the specific bit. In this case, compared to the user data, the number of error bits of the flip data may decrease, and thus, the error correction operation of the flip data may succeed.

In an embodiment, specific bits of the user data (i.e., candidate bits or targeted bits for the bit flip operation) may be selected based on a correction history table. For example, the correction history table may include information about error bits corrected by a previous error correction operation. For example, the correction history table may include address information of error bits detected and/or corrected in a previous error correction operation. That is, according to an example embodiment, the control operation of a memory controller 110 may include managing, in the correction history table, addresses of previously occurring error bits, which have been corrected, and selecting specific bits (i.e., candidate bits or targeted bits) for the bit flip operation based on the correction history table. Thus, the reliability of the memory system 100 may be improved. However, the disclosure is not limited to a table, and as such, information about previous error bits may be stored in various manner. A configuration and an operation of the error manager 112 according to embodiments of the disclosure will be described in detail with reference to the following drawings.

Figure 2:
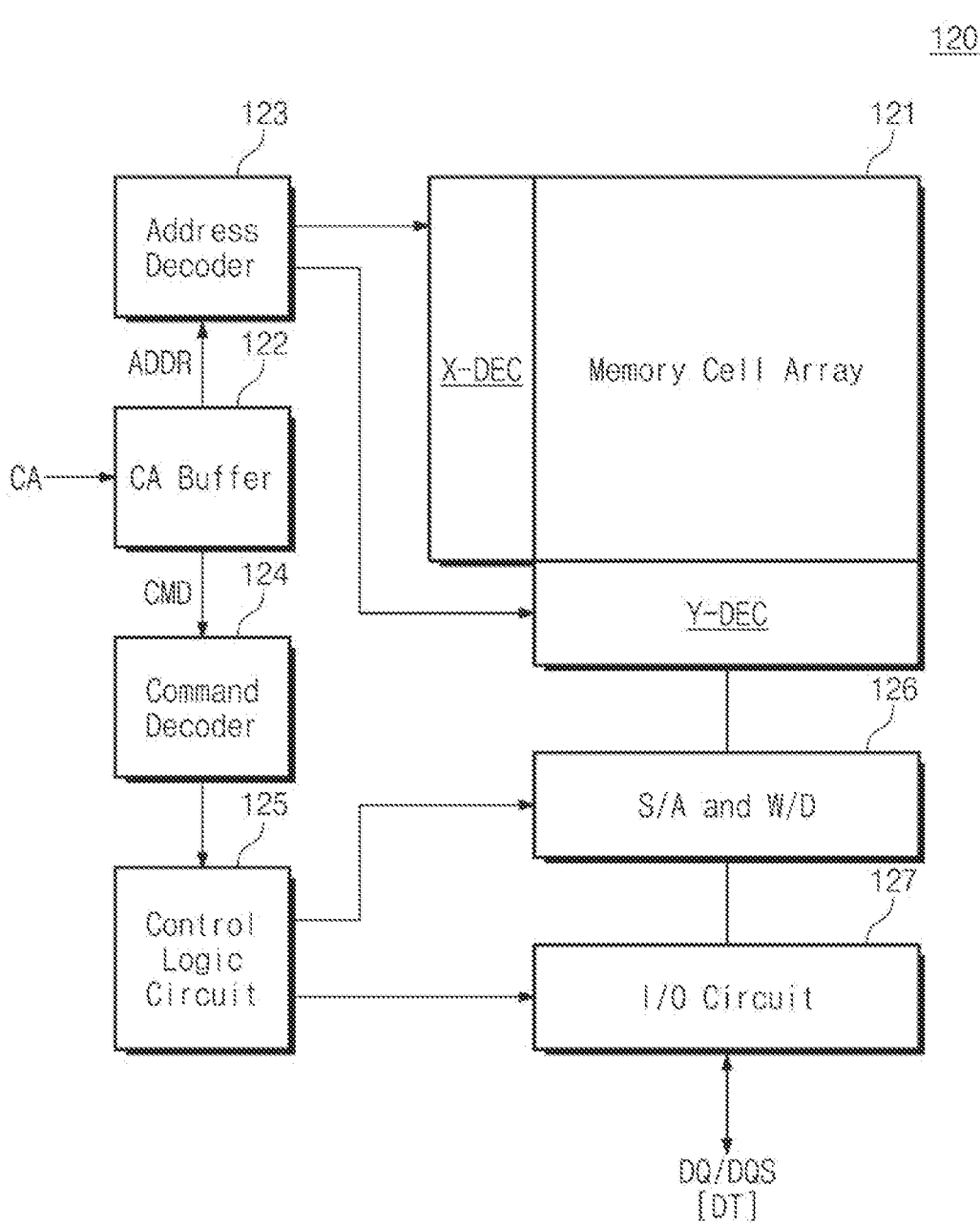
FIG. 2 is a block diagram illustrating a memory device of FIG. 1.

FIG. 2 is a block diagram illustrating a memory device of FIG. 1. Referring to FIGS. 1 and 2, the memory device 120 may include a memory cell array 121, a command/address (CA) buffer 122, an address decoder 123, a command decoder 124, a control logic circuit 125, a sense amplifier (S/A) and write driver (W/D) 126, and an input and output I/O circuit 127.

The memory cell array 121 may include a plurality of memory cells. Each of the plurality of memory cells may be a DRAM cell that includes an access transistor and a storage capacitor. The plurality of memory cells may be connected to a plurality of word lines and a plurality of bit lines. In an embodiment, the plurality of word lines may be driven by an X-decoder (or row decoder) X-DEC, and the plurality of bit lines may be driven by a Y-decoder (or column decoder) Y-DEC.

The CA buffer 122 may be configured to receive command/address signals CA from the memory controller 110 and to temporarily store or buffer the received signals.

The address decoder 123 may receive an address ADDR from the CA buffer 122 and may decode the received address ADDR. The address decoder 123 may control the X-decoder X-DEC and the Y-decoder Y-DEC based on the decoding result.

The command decoder 124 may receive a command CMD from the CA buffer 122 and may decode the received command CMD. The command decoder 124 may provide the decoding result to the control logic circuit 125.

The control logic circuit 125 may control an overall operation of the memory device 120 based on the decoding result of the command decoder 124. For example, when the decoding result of the command decoder 124 corresponds to a write command (i.e., when the command CMD received from the memory controller 110 is the write command), the control logic circuit 125 may control an operation of the sense amplifier and write driver 126 (i.e., may activate the write driver) such that data DT received through the I/O circuit 127 are written in the memory cell array 121.

Alternatively, when the decoding result of the command decoder 124 corresponds to a read command (i.e., when the command CMD received from the memory controller 110 is the read command), the control logic circuit 125 may control an operation of the sense amplifier and write driver 126 (i.e., may activate the sense amplifier) such that data stored in the memory cell array 121 are read out and may control the I/O circuit 127 such that the data DT are output to the memory controller 110.

Under control of the control logic circuit 125, the sense amplifier and write driver 126 may read data from the memory cell array 121 through the plurality of bit lines or may write data in the memory cell array 121 through the plurality of bit lines.

Through a data signal DQ and a data strobe signal DQS from the memory device 120, the I/O circuit 127 may receive the data DT from the memory controller 110 or may output the data DT to the memory controller 110.

Figure 3:
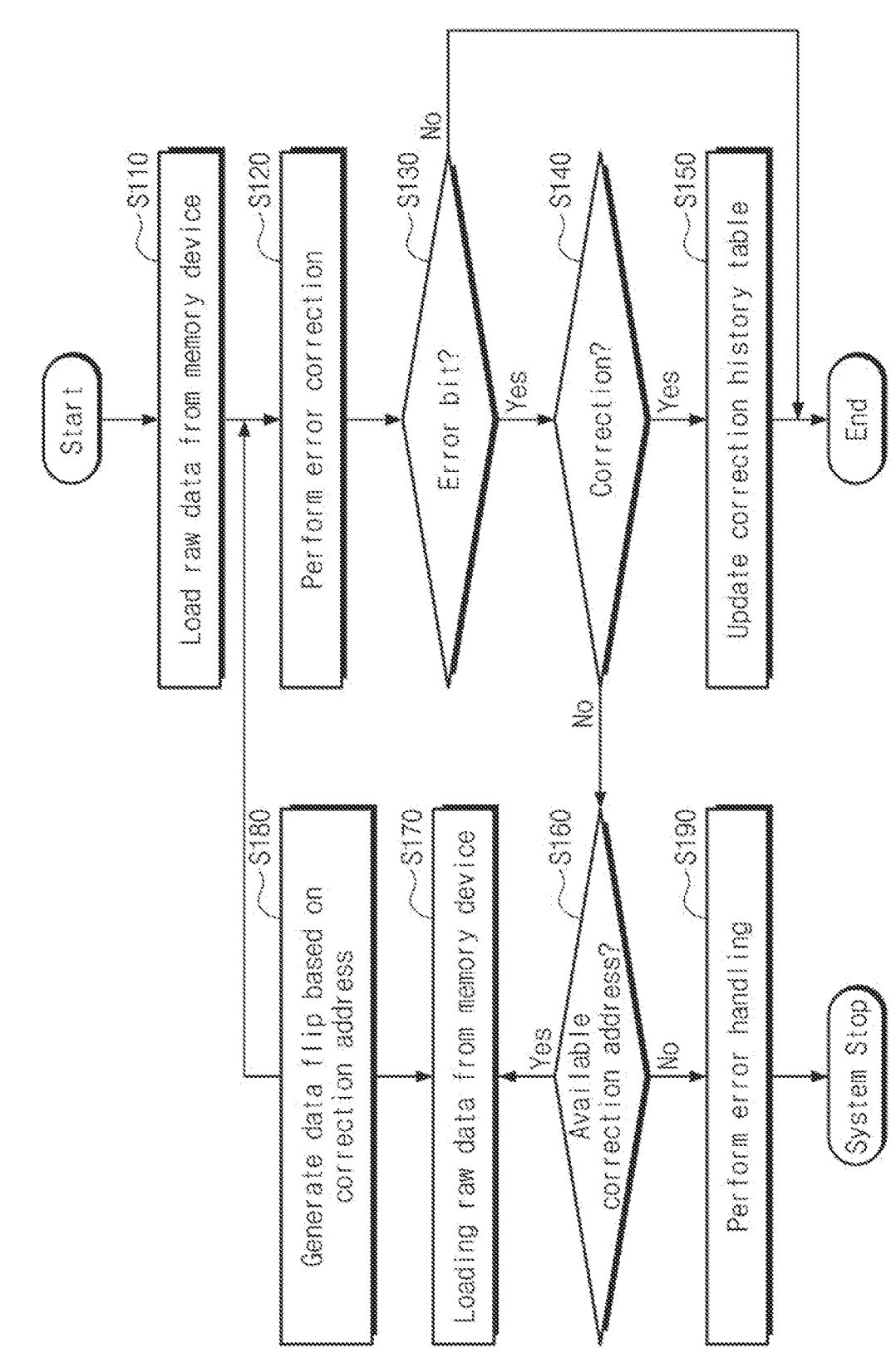
FIG. 3 is a flowchart illustrating an operation of a memory controller of FIG. 1.

FIG. 3 is a flowchart illustrating an operation of a memory controller of FIG. 1. Referring to FIGS. 1 and 3, in operation S110, the memory controller 110 may load raw data DT_RAW from the memory device 120. For example, the memory controller 110 may transmit an address corresponding to the raw data DT_RAW and a read command to the memory device 120. In response to the read command, the memory device 120 may read the raw data DT_RAW stored in a region corresponding to the received address and may transmit the read raw data DT_RAW to the memory controller 110.

In operation S120, the memory controller 110 may perform the error correction operation on the raw data DT_RAW. For example, the raw data DT_RAW read from the memory device 120 may include user data and parity data. The ECC engine 111 of the memory controller 110 may perform the error correction operation on the user data by using the parity data included in the raw data DT_RAW.

In operation S130, the memory controller 110 may determine whether the raw data DT_RAW included an error bit. For example, the memory controller 110 may determine whether the raw data DT_RAW included an error bit, based on information generated in the error correction operation, such as an error vector.

When the raw data DT_RAW does not include an error bit, the memory controller 110 may end the read operation without performing a separate operation, such as an operation related to error correction. According to an embodiment, the memory controller 110 may determine based on a result from the error correction operation in S120 that the raw data DT_RAW did not include an error bit, and complete the read operation without performing a separate operation based on the determination that the raw data DT_RAW did not include an error bit. For example, the memory controller 110 may end the read operation by perform various operations such as an operation for transferring the raw data DT_RAW to an external host or other operation using the raw data DT_RAW.

When the raw data DT_RAW includes an error bit, in operation S140, the memory controller 110 may determine whether the error bit of the raw data DT_RAW is corrected. For example, the memory controller 110 may determine whether the error bit of the raw data DT_RAW is corrected, based on information generated in the error correction operation, such as a decoding status flag. For example, the memory controller 110 may determine that the error bit of the raw data DT_RAW is corrected, based on information generated in the error correction operation indicating that the error bit was corrected. For example, the decoding status flag may include that the error bit was corrected.

When the error bit of the raw data DT_RAW is corrected, in operation S150, the memory controller 110 may update a correction history table. For example, the ECC engine 111 of the memory controller 110 may identify or output an address corresponding to the corrected error bit of the raw data DT_RAW. The error manager 112 of the memory controller 110 may record the address corresponding to the corrected error bit of the raw data DT_RAW at the correction history table as a correction address ADDR_COR or may update the correction history table such that the address is stored in the correction history table. That is, the correction address ADDR_COR may be an address of a memory cell corresponding to the corrected error bit from among a plurality of memory cells, and the correction history table may include a plurality of correction addresses. For example, the address may be a physical address of a memory cell corresponding to the corrected error bit from among a plurality of memory cells.

According to an embodiment, the memory controller 110 may end or complete the read operation after the correction history table is updated. The memory controller 110 may perform various operations (e.g., the transfer of the corrected data to any other external host) by using the corrected data.

According to an embodiment, when the determination result in operation S140 indicates that the error bit of the raw data DT_RAW is not corrected, in operation S160, the memory controller 110 may determine whether an available correction address is present in the correction history table. For example, the error manager 112 of the memory controller 110 may identify correction addresses corresponding to a row address of the raw data DT_RAW from among the correction addresses of the correction history table. The error manager 112 may determine whether correction addresses where the bit flip operation is not performed are present in the identified correction addresses. For example, the error manager 112 may determine whether the correction history table includes one or more correction addresses on which the bit flip operation has not yet been performed.

According to an embodiment, if there exists one or more correction addresses on which the bit flip operation has not been performed means that an available correction address exists. In this case, in operation S170, the memory controller 110 may again load the raw data DT_RAW from the memory device 120. Operation S170 may be similar to operation S110, and thus, additional description will be omitted to avoid redundancy.

In operation S180, the memory controller 110 may generate flip data DT_F by selecting at least one of the available correction addresses in the correction history table as a target flip address and performing the bit flip operation on the raw data DT_RAW based on the selected target flip address.

For example, the error manager 112 of the memory controller 110 may select, as the target flip address, at least one of correction addresses (i.e., available correction addresses), which correspond to the row address of the raw data DT_RAW and where the bit flip operation is not yet performed, from among the correction addresses of the correction history table. The error manager 112 may generate the flip data DT_F by performing the bit flip operation on a bit corresponding to the target flip address from among a plurality of bits of the raw data DT_RAW.

According to an embodiment, the memory controller 110 may again perform operation S120 after the error manager 112 generates the flip data DT_F. In this case, the remaining operations are similar to the above operations except that the memory controller 110 performs the error correction operation on the flip data DT_F instead of the raw data DT_RAW, and thus, additional description will be omitted to avoid redundancy.

The memory controller 110 may repeatedly perform operation S120 to operation S180 until the error bit of the flip data DT_F is corrected or until there is no available correction address. In an embodiment, even though an available correction address exists, the memory controller 110 may repeatedly perform operation S120 to operation S180 as much as a reference number of times. In an embodiment, the reference number of times may be predetermined. For example, in a correction history table CHT (illustrated in FIG. 4), when the number of available correction addresses is 10, the memory controller 110 may repeatedly perform operation S120 to operation S180 up to 10 times. However, the disclosure is not limited to 10 times, and as such, the number of times may be less than or greater than 10. In this case, the performance of the memory controller 110 may be reduced. Accordingly, the reduction of performance of the memory controller 110 may be prevented by limiting the number of times that a bit flip operation and an error correction operation of one original data are repeated.

In operation S160, when an available correction address is absent in the correction history table, in operation S190, the memory controller 110 may perform an error handling operation. For example, the memory controller 110 may perform the system interrupt or the system reset for the memory system 100. Afterwards, the memory system 100 may be interrupted and may perform various management operations for error management.

In an embodiment, in operation S180, when the bit corresponding to the target flip address is a normal bit, the bit corresponding to the target flip address may be changed to an error bit through the bit flip operation; when the bit corresponding to the target flip address is an error bit, the bit corresponding to the target flip address may be changed to a normal bit through the bit flip operation. Assuming that the raw data DT_RAW include N error bits and the bit flip operation is performed on the m error bits, the flip data DT_F may include $(N- m)$ to $(N+m)$ error bits. That is, because the target flip address selected from the correction history table is an address corresponding to the previously corrected error bits, the probability of an error in the current raw data DT_RAW may be high. That is, when the bit flip operation is performed based on the target flip address selected from the correction history table, the number of error bits of the flip data DT_F may decrease compared to the raw data DT_RAW; in this case, the error of the flip data DT_F may be included in the error correction capability range of the ECC engine 111. Accordingly, even though the number of error bits of the raw data DT_RAW exceeds the error correction level, the corrected data may be provided through the bit flip operation that is based on the correction address.

Figure 4:
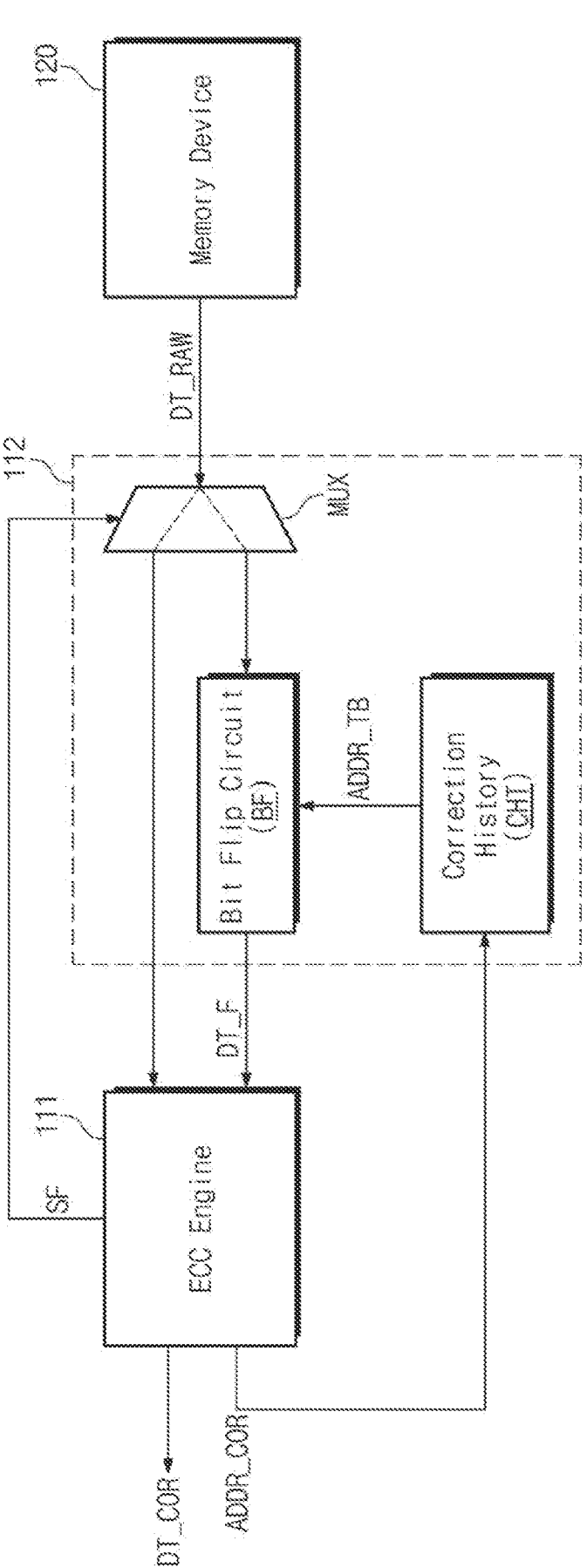
FIG. 4 is a diagram for describing an operation of a memory controller of FIG. 1.

FIG. 4 is a diagram for describing an operation of a memory controller of FIG. 1. Referring to FIGS. 1 and 4, the memory controller 110 may include the ECC engine 111 and the error manager 112. The error manager 112 may include a MUX circuit, a bit flip circuit BF, and the correction history table CHT.

The memory controller 110 may read the raw data DT_RAW from the memory device 120. The raw data DT_RAW may be provided to the error manager 112. In the first read operation of the raw data DT_RAW, the MUX circuit may provide the raw data DT_RAW to the ECC engine 111. According to an embodiment, the first read operation may include a first error correction operation, and in the first error correction operation, the MUX circuit may provide the raw data DT_RAW to the ECC engine 111.

The ECC engine 111 may perform the error correction operation on the raw data DT_RAW. When the error bit of the raw data DT_RAW is corrected by the ECC engine 111, the ECC engine 111 may output corrected data DT_COR. In an embodiment, when the error bit of the raw data DT_RAW is corrected by the ECC engine 111, the ECC engine 111 may output the correction address ADDR_COR corresponding to the corrected error bit of the raw data DT_RAW. The correction address ADDR_COR may be recorded and managed at the correction history table CHT of the error manager 112. That is, the correction history table CHT may include information about an address corresponding to error bits previously corrected by the ECC engine 111. The address corresponding to the error bits previously corrected by the ECC engine 111 may be the correction address ADDR_COR.

In an embodiment, the correction history table CHT may be stored and managed in a separate storage circuit included in the memory controller 110. For example, the separate storage circuit may be a register or an SRAM.

When the error bit of the raw data DT_RAW is not corrected by the ECC engine 111, the ECC engine 111 may output a status flag SF indicating a fail state. In this case, the memory controller 110 may again load the raw data DT_RAW from the memory device 120, and the raw data DT_RAW may be provided to the MUX circuit of the error manager 112. The MUX circuit provides the raw data DT_RAW to the bit flip circuit BF in response to the status flag SF indicating the fail state.

The bit flip circuit BF may output the flip data DT_F by receiving a target flip address ADDR_TB from the correction history table CHT and performing the bit flip operation on a bit corresponding to the target flip address ADDR_TB received from the correction history table CHT. The flip data DT_F may be provided to the ECC engine 111.

The ECC engine 111 may perform the error correction operation on the flip data DT_F. When an error is corrected, the ECC engine 111 may output the corrected data DT_COR and the correction address ADDR_COR. When an error is not corrected, the ECC engine 111 may output the status flag SF indicating the fail state, and the error manager 112 may repeatedly perform the above operation until an available correction address is absent from the correction history table CHT.

Figure 5:
FIG. 5 is a diagram illustrating memory cells of a memory cell array of a memory device of FIG. 2.

FIG. 5 is a diagram illustrating memory cells of a memory cell array of a memory device of FIG. 2. FIG. 6 is a diagram for describing a correction history table of FIG. 4. In an embodiment, an operation in which the correction history table CHT is managed will be described with reference to FIGS. 5 and 6.

Referring to FIGS. 2, 4, 5, and 6, the memory cell array 121 may include a plurality of memory cells. The plurality of memory cells may be arranged in a array having a plurality of rows and columns. For example, the rows of the memory cell array 121 may include 16 rows (i.e., rows R00 to R15) and 32 columns (i.e., columns C00 to C31). In an embodiment, memory cells located at the same row may be connected to the same word line, and memory cells located at the same column may be connected to the same bit line. However, the disclosure is not limited thereto. For example, the memory cell array 121 may further include a plurality of memory cells.

In an embodiment, an error may frequently occur at specific memory cells due to a physical characteristic or a physical defect of a specific memory cell among the plurality of memory cells. For example, as illustrated in FIG. 5, an error may frequently occur at memory cells located at the 1st row R01 and the 2nd column C02, the 1st row R01 and the 4th column C04, the 1st row R01 and the 16th column C16, the 1st row R01 and the 23rd column C23, the 5th row R05 and the 3rd column C03, the 5th row R05 and the 11th column C11, and the 13th row R13 and the 1st column C01.

When the errors occurring at the above memory cells are corrected by the ECC engine 111, address information of each of the above memory cells may be written in the correction history table CHT as the correction address ADDR_COR. For example, as illustrated in FIG. 6, the correction history table CHT may include address information (i.e., the correction address ADDR_COR) of memory cells corresponding to the error-corrected bits.

In an embodiment, the correction history table CHT may manage the correction address ADDR_COR in units of row. The row unit may correspond to a unit by which activation or data input/output is made under control of the memory controller 110.

However, the disclosure is not limited thereto. For example, the correction address ADDR_COR included in the correction history table CHT may indicate a physical address of a memory cell where an error is corrected and may be managed in various schemes.

As described above, the memory controller 110 may manage addresses corresponding to bits or memory cells where errors are corrected by the error correction operation of the ECC engine 111, as the correction address ADDR_COR.

In an embodiment, the correction address ADDR_COR may be a physical address of a memory cell corresponding to a bit where an error is corrected, but the disclosure is not limited thereto. For example, the correction address ADDR_COR may be a logical address corresponding to a bit where an error is corrected.

Figure 7A:
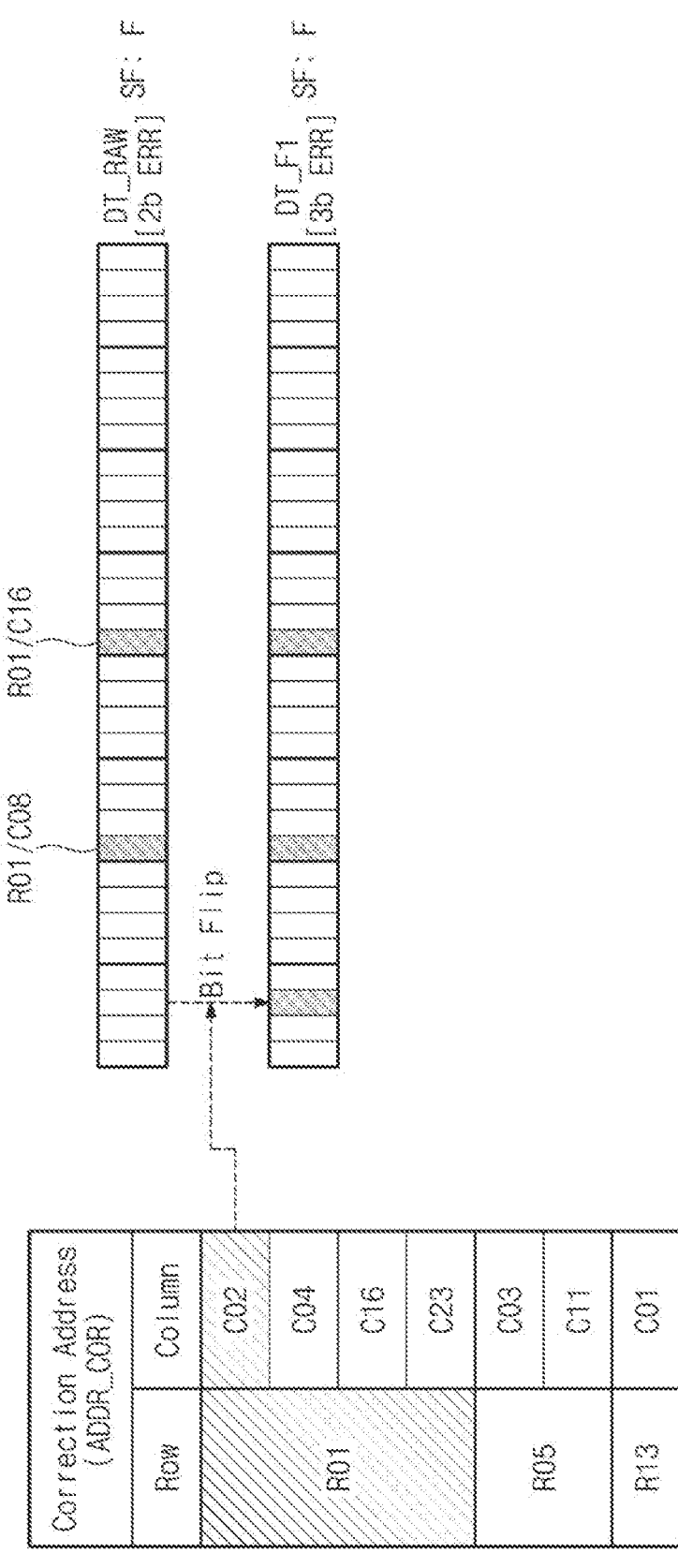
Figure 7B:
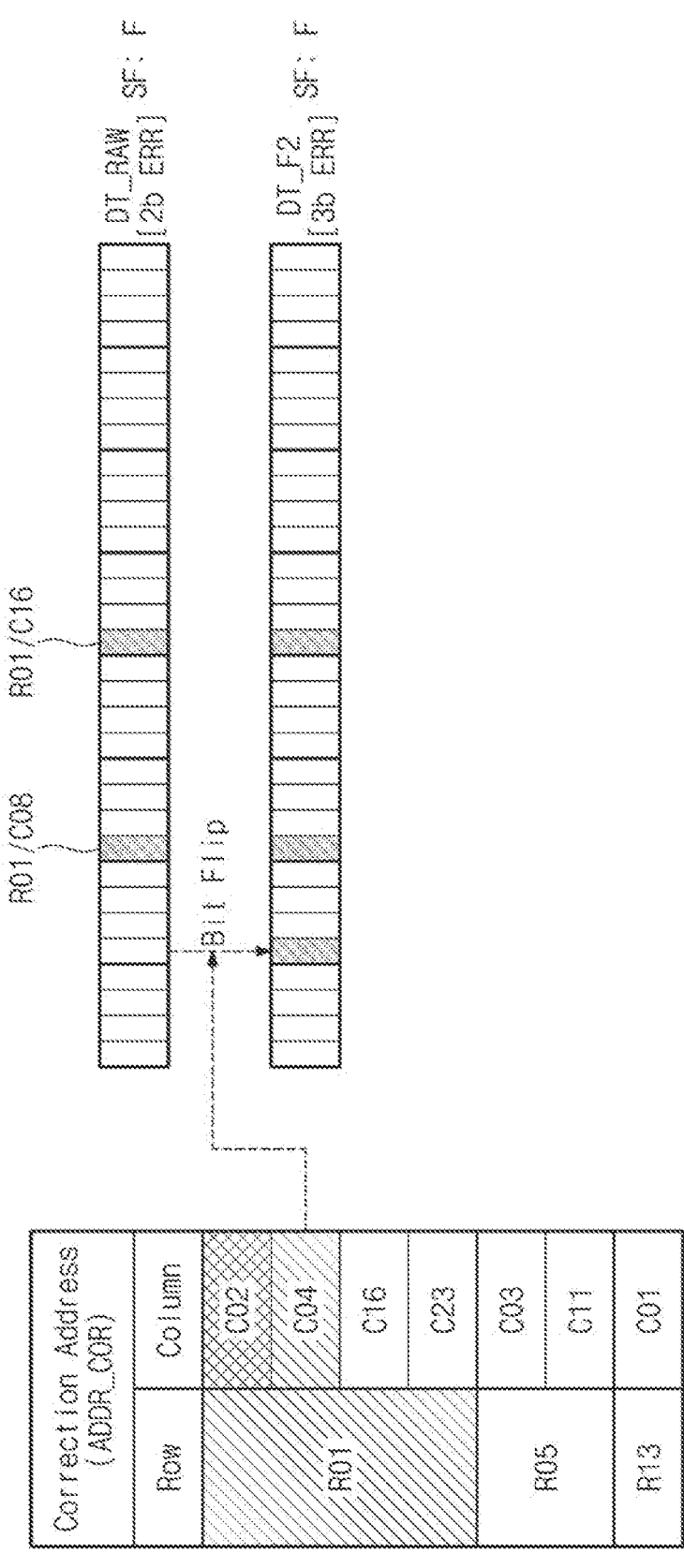

FIGS. 7A to 7C are diagrams for describing an operation of a memory controller of FIG. 1. Referring to FIGS. 1, 4, 5, 7A, 7B, and 7C, the memory controller 110 may read the raw data DT_RAW from the memory device 120 and may perform the error correction operation on the raw data DT_RAW.

For convenience of description, in the disclosure below, it is assumed that the raw data DT_RAW are 32-bit user data and are stored in memory cells located at the 1st row R01 of the memory cell array 121. In this case, the memory controller 110 may perform the error correction operation by using the parity data received together with the raw data DT_RAW from the memory device 120. Also, it is assumed that each of bits located at the 8th column C08 and the 16th column C16 of the raw data DT_RAW is an error bit. That is, the raw data DT_RAW include two error bits "2b ERR". It is assumed that the ECC engine 111 is capable of correcting one error bit "1b ERR" (i.e., single error correction (SEC)) and is incapable of correcting two or more error bits. It is assumed that the correction history table CHT is managed as described with reference to FIG. 6.

First, as illustrated in FIG. 7A, because the raw data DT_RAW include two error bits "2b ERR", the error bits may be incapable of being corrected by the ECC engine 111. In this case, the ECC engine 111 may output the status flag SF indicating a fail "F" of the error correction operation.

In response to the status flag SF indicating the fail "F" of the error correction operation, the memory controller 110 may again load the raw data DT_RAW from the memory device 120 and may perform the bit flip operation on a specific bit of the raw data DT_RAW based on the correction history table CHT. For example, as illustrated in FIG. 7A, the correction history table CHT may include information about the correction address ADDR_COR corresponding to a row address (i.e., the 1st row R01) of the raw data DT_RAW. In this case, the bit flip circuit BF of the error manager 112 may select the 2nd column C02 of the 1st row R01, as a target flip address, based on the correction history table CHT. The error manager 112 may generate first flip data DT_F1 by performing the bit flip operation on a bit of the raw data DT_RAW, which corresponds to the target flip address (i.e., the 2nd column C02 of the 1st row R01). In this case, because the bit corresponding to the 2nd column C02 of the 1st row R01 from among the bits of the raw data DT_RAW is a normal bit, the flipped bit may be an error bit. That is, the first flip data DT_F1 may include three error bits "3b ERR", and the error of the first flip data DT_F1 may be incapable of being corrected by the ECC engine 111. In this case, the ECC engine 111 may output the status flag SF indicating the fail "F" of the error correction operation.

In response to the status flag SF indicating the fail "F" of the error correction operation, the memory controller 110 may again load the raw data DT_RAW from the memory device 120 and may again perform the bit flip operation on a specific bit of the raw data DT_RAW based on the correction history table CHT. In this case, the error manager 112 may perform the bit flip operation based on an available correction address among the correction addresses ADDR_COR of the correction history table CHT. For example, as illustrated in FIG. 7B, in the correction history table CHT, because the bit flip operation is previously performed on the bit located at the 1st row R01 and the 2nd column C02, the error manager 112 may generate second flip data DT_F2 by selecting an address corresponding to a bit at the 1st row R01 and the 4th column C04 as a target flip address and performing the bit flip operation on the bit corresponding to the target flip address. In this case, because the bit at the 1st row R01 and the 4th column C04 is a normal bit in the raw data DT_RAW, the bit may be changed to an error bit through the bit flip operation. In this case, the second flip data DT_F2 may include three error bits "3b ERR". Accordingly, the error bits of the second flip data DT_F2 may not be corrected by the ECC engine 111. In this case, the ECC engine 111 may output the status flag SF indicating the fail "F" of the error correction operation.

Likewise, in response to the status flag SF indicating the fail "F" of the error correction operation, the memory controller 110 may again load the raw data DT_RAW from the memory device 120 and may again perform the bit flip operation on a specific bit of the raw data DT_RAW based on the correction history table CHT. For example, as illustrated in FIG. 7C, the error manager 112 may generate third flip data DT_F3 by selecting an address corresponding to a bit at the 1st row R01 and the 16th column C16 as a target flip address and performing the bit flip operation on the bit corresponding to the target flip address. In this case, because the bit located at the 1st row R01 and the 16th column C16 from among the bits of the raw data DT_RAW is an error bit, the bit may be changed to a normal bit through the bit flip operation. Accordingly, the third flip data DT_F3 may include one error bit "1b ERR", the one error bit "1b ERR" may be corrected by the ECC engine 111, and the ECC engine 111 may output the corrected data and may output the status flag SF indicating a success "S" of the error correction operation.

In an embodiment, because the error bit of the third flip data DT_F3 corresponding to a bit at the 1st row R01 and the 8th column C08 is corrected, the ECC engine 111 may output information about the 1st row R01 and the 8th column C08 as the correction address ADDR_COR, and the error manager 112 may add the information about the 1st row R01 and the 8th column C08 to the correction history table CHT as the correction address ADDR_COR (or may update the correction history table CHT such that the information is stored as the correction address ADDR_COR).

According to an embodiment of the disclosure, the memory controller 110 may manage the correction address ADDR_COR corresponding to the error bit corrected by the ECC engine 111 by using the correction history table CHT. When the error correction operation of data read from the memory device 120 fails, the memory controller 110 may perform the bit flip operation on the data read from the memory device 120 based on the correction history table CHT. Accordingly, even though the read data includes an error exceeding the error correction capability range of the ECC engine 111, the error of the read data may be corrected. Accordingly, the reliability of the memory system 100 may be improved.

Figure 9:
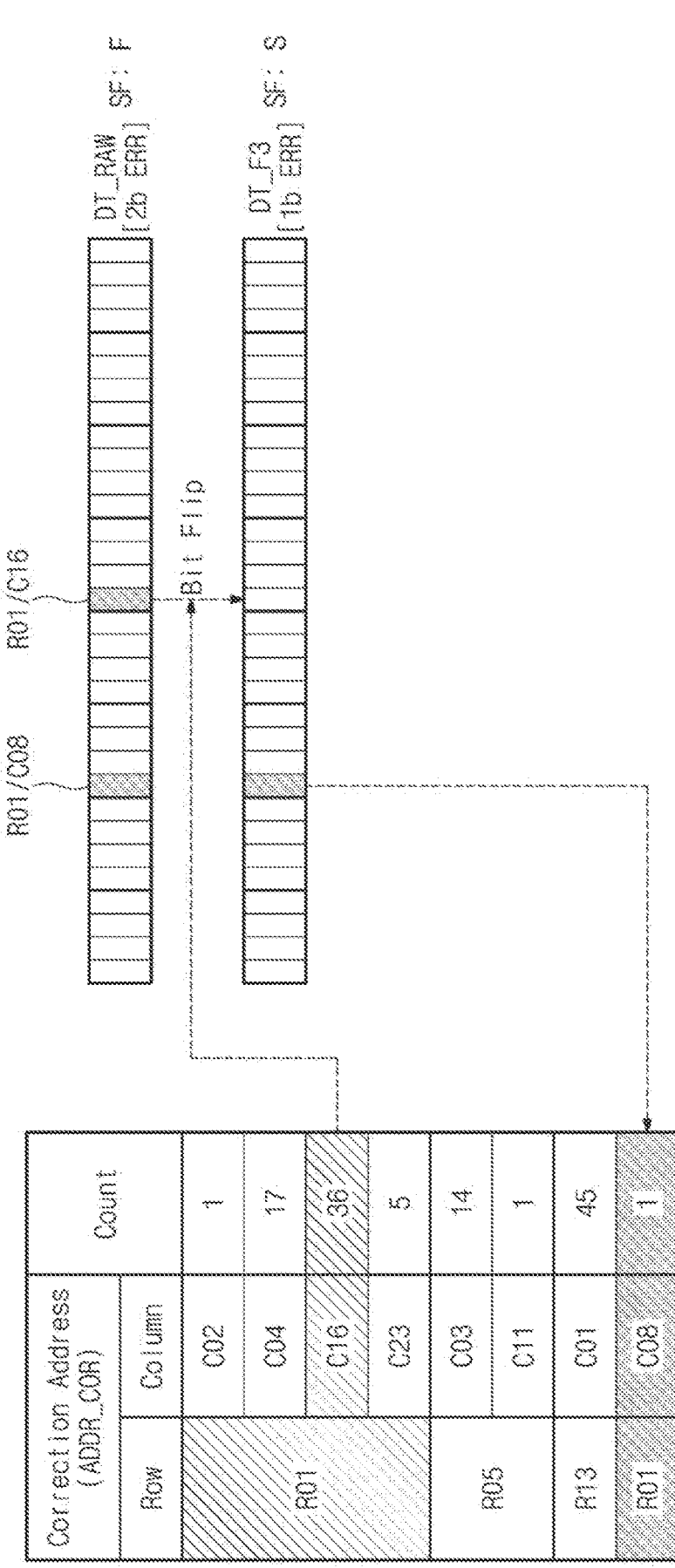
FIG. 9 is a diagram for describing a bit flip operation using a correction history table of FIG. 8.

FIG. 8 is a diagram illustrating a correction history table of FIG. 4. FIG. 9 is a diagram for describing a bit flip operation using a correction history table of FIG. 8. Referring to FIGS. 4, 8, and 9, a correction history table CHT-1 may include information about the correction address ADDR_COR. A configuration of the correction address ADDR_COR is similar to that described with reference to FIGS. 5 and 6, and thus, additional description will be omitted to avoid redundancy.

In an embodiment, in the embodiment described with reference to FIGS. 7A to 7C, the memory controller 110 may perform the bit flip operation based on the correction address ADDR_COR corresponding to a row address of the raw data DT_RAW. In this case, the bit flip operations for the correction addresses ADDR_COR may be performed in an arbitrary order. Alternatively, the bit flip operations for the correction addresses ADDR_COR may be performed in the order of correcting errors.

However, the disclosure is not limited to the illustration in FIG. 7C, and as such, according to another embodiment, the order of the bit flip operations may be performed based on different criteria. For example, the bit flip operations for the correction addresses ADDR_COR may be performed based on an occurrence frequency. For example, as illustrated in FIG. 8, the correction history table CHT-1 may include a count corresponding to each of the correction addresses ADDR_COR. The count may indicate the number of times that an error bit of the correction address ADDR_COR is corrected.

In detail, the correction history table CHT-1 of FIG. 8 shows that, with regard to a bit corresponding the 2nd column C02 of the 1st row R01, an error occurs once and an error is corrected, that, with regard to a bit corresponding to the 4th column C04 of the 1st row R01, an error occurs 17 times and an error is corrected, that, with regard to a bit corresponding to the 16th column C16 of the 1st row R01, an error occurs 36 times and an error is corrected, that, with regard to a bit corresponding to the 23rd column C23 of the 1st row R01, an error occurs 5 times and an error is corrected, that, with regard to a bit corresponding to the 3rd column C03 of the 5th row R05, an error occurs 14 times and an error is corrected, that, with regard to a bit corresponding to the 11th column C11 of the 5th row R05, an error occurs once and an error is corrected, and that, with regard to a bit corresponding to the 1st column C01 of the 13th row R13, an error occurs 45 times and an error is corrected. That is, it is understood that as the count increases, the number of times that an error occurs at a bit corresponding to the count increases.

The memory controller 110 may select the correction address ADDR_COR corresponding to the greatest count (i.e., a bit where an error most occurs) as a target flip address and may perform the bit flip operation based on the target flip address. In this case, because the bit flip is performed on a bit with a high error occurrence frequency, the probability that an error bit is flipped to a normal bit may be high. Accordingly, the number of times that operations are repeated to perform the error correction may be decreased. For example, the number of times a bit flip operation and an error correction operation are repeated performed to correct the error bits may be reduced.

For example, as illustrated in FIG. 9, the raw data DT_RAW may include two error bits "2b ERR". In this case, an error may not be corrected by the ECC engine 111, and thus, the error manager 112 of the memory controller 110 may perform the bit flip operation based on the correction history table CHT.

The error manager 112 may select, as a target flip address, at least one of correction addresses corresponding to a row address of the raw data DT_RAW from among the correction addresses ADDR_COR of the correction history table CHT. In this case, the error manager 112 may select the target flip address based on counts of the correction addresses ADDR_COR. In the embodiment of FIG. 9, because the count of the 16th column C16 of the 1st row R01 has the greatest value, for example, a value of "36", the bit flip operation may be performed on a bit of the raw data DT_RAW, which corresponds to the selected target flip address (e.g., the 16th column C16 of the 1st row R01), and thus, the third flip data DT_F3 may be generated. In this case, because the third flip data DT_F3 include one error bit "1b ERR", the error bit may be corrected by the ECC engine 111.

Because the error bit corresponding to the 8th column C08 of the 1st row R01 is corrected, an address for the 8th column C08 of the 1st row R01 may be added to the correction history table CHT as the correction address ADDR_COR, and the count corresponding to the address may be set to "1". In an embodiment, when the correction history table CHT already includes the address for the 8th column C08 of the 1st row R01 as the correction address ADDR_COR, the corresponding count may increase as much as "1".

As described above, when the error of the raw data DT_RAW is not corrected by the ECC engine 111, the memory controller 110 may generate flip data by performing the bit flip operation on the raw data DT_RAW based on the correction history table CHT-1 and may perform the error correction operation on the flip data. In this case, the memory controller 110 may preferentially perform the bit flip operation on a bit corresponding to the correction address ADDR_COR having the highest error occurrence frequency, based on the count included in the correction history table CHT-1. According to the above description, an error bit included in the raw data DT_RAW may be preferentially flipped, that is, an error of the raw data DT_RAW (or an error of the flip data) may be preferentially corrected, and thus, the number of times that operations (e.g., a bit flip operation and an error correction operation) are repeated may decrease.

In an embodiment, the count for each correction address ADDR_COR included in the correction history table CHT-1 may be managed in units of specific window. For example, the count for each correction address ADDR_COR included in the correction history table CHT-1 may indicate the number of times that an error is corrected during a window period from a given previous time to a current time.

In an embodiment, depending on various schemes, the memory controller 110 may perform the bit flip operation on the raw data DT_RAW based on the correction history table CHT. For example, as described above, the memory controller 110 may perform the bit flip operation on the raw data DT_RAW in an arbitrary order, based on the correction history table CHT. Alternatively, the memory controller 110 may perform the bit flip operation on the raw data DT_RAW in the order of an error occurrence frequency, based on the correction history table CHT-1. Alternatively, the memory controller 110 may perform the bit flip operation on the raw data DT_RAW in the order of most recently correcting an error, based on the correction history table CHT.

The above method of managing the correction history table CHT and the above order of the bit flip operation for the raw data DT_RAW may be variously changed and modified without departing from the technical idea of the invention, and it may be understood that the scope of the invention is not limited to the embodiments disclosed herein.

FIG. 10 is a flowchart illustrating an operation of a memory controller of FIG. 1 according to another embodiment. Referring to FIGS. 1 and 10, in operation S210, the memory controller 110 may load the raw data DT_RAW from the memory device 120. In operation S220, the memory controller 110 may perform the error correction operation on the raw data DT_RAW. In operation S230, the memory controller 110 may determine whether an error bit exists. When there is no error bit in the raw data DT_RAW, the memory controller 110 may end the read operation. Where an error exists, in operation S240, the memory controller 110 may determine whether the error is corrected. When the error is corrected, in operation S250, the memory controller 110 may update the correction history table CHT. When the error is not corrected, in operation S260, the memory controller 110 may determine whether an available correction address ADDR_COR is present in the correction history table. When the available correction address ADDR_ COR exists (or when the memory controller 110 determines that the available correction address ADDR_COR exists, in operation S270, the memory controller 110 may again load the raw data DT_RAW from the memory device 120.

In an embodiment, operation S210 to operation S270 may be similar to operation S110 to operation S170 of FIG. 3, and thus, additional description will be omitted to avoid redundancy.

In operation S275, the memory controller 110 may select the correction address ADDR_COR based on error bits. For example, through the error correction operation in operation S220, the number of error bits included in the raw data DT_RAW may be determined. It is assumed that the number of error bits correctable by the ECC engine 111 is "K" (K being a natural number) and the number of error bits included in the raw data DT_RAW is "N" (N being a natural number greater than K). In this case, when the bit flip operation is performed (N–K) error bits in the raw data DT_RAW, the flip data DT_F may include K error bits. In this case, the error of the flip data DT_F may be corrected by the ECC engine 111. That is, the number of bits targeted for the bit flip operation may be determined based on the number of error bits included in the raw data DT_RAW and the error correction capability of the ECC engine 111. The error manager 112 of the memory controller 110 may select (N– K) error correction addresses from the correction history table CHT. Herein, N indicates the number of error bits included in the raw data DT_RAW, and K indicates the number of error bits correctable by the ECC engine 111. For example, the memory controller 110 may select a plurality of candidate error correction addresses from the correction history table CHT.

According to an embodiment, in operation S280, the memory controller 110 generates the flip data DT_F by performing the bit flip operation on the raw data DT_RAW based on the selected correction addresses ADDR_COR. According to an embodiment, the memory controller 110 generates the flip data DT_F by simultaneously (i.e., at a same time) performing the bit flip operation on the raw data DT_RAW based on the selected correction addresses ADDR_COR. However, the disclosure is not limited thereto, and as such, according to another embodiment, the memory controller 110 generates the flip data DT_F by serially (i.e., one at a time) performing the bit flip operation on the raw data DT_RAW based on the selected correction addresses ADDR_COR. The memory controller 110 may again perform operation S220. The following operations are similar to those described with reference to FIG. 3, and thus, additional description will be omitted to avoid redundancy.

When there is no available correction address ADDR_ COR, in operation S290, the memory controller 110 may perform the error handling operation, and the memory system 100 may then be interrupted.

Figure 11A:
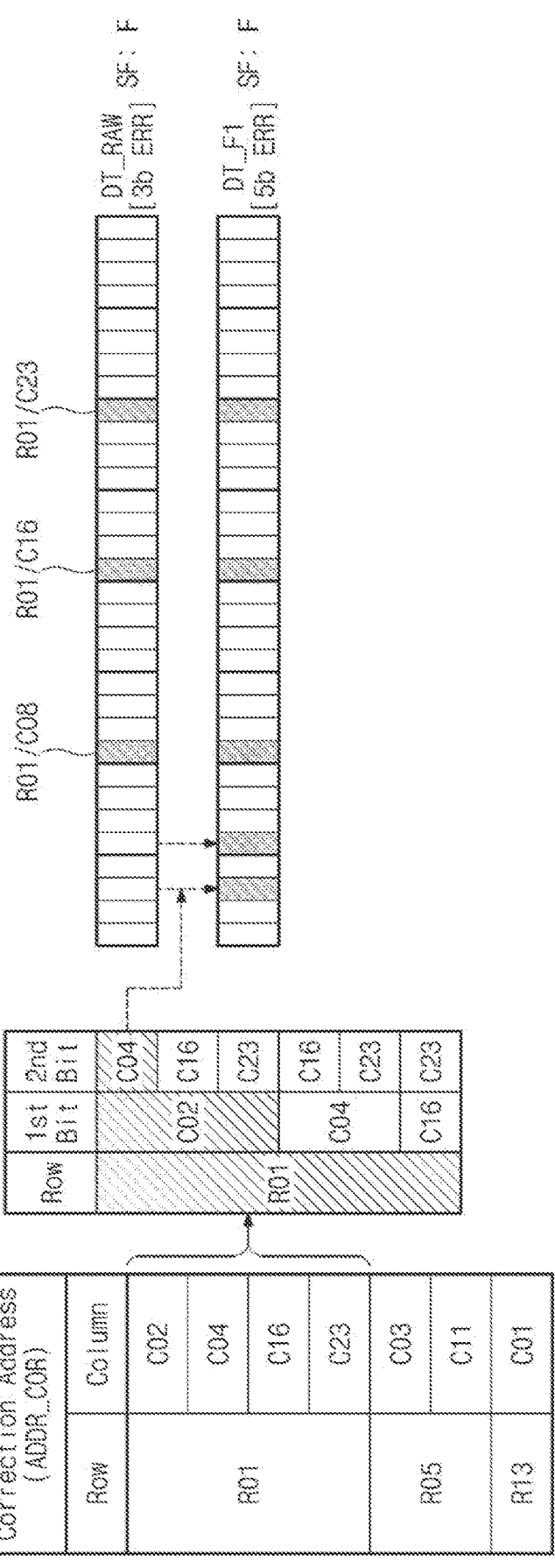
FIGS. 11A and 11B are diagrams for describing an operation of a memory controller according to the flowchart of FIG. 10.
Figure 11B:
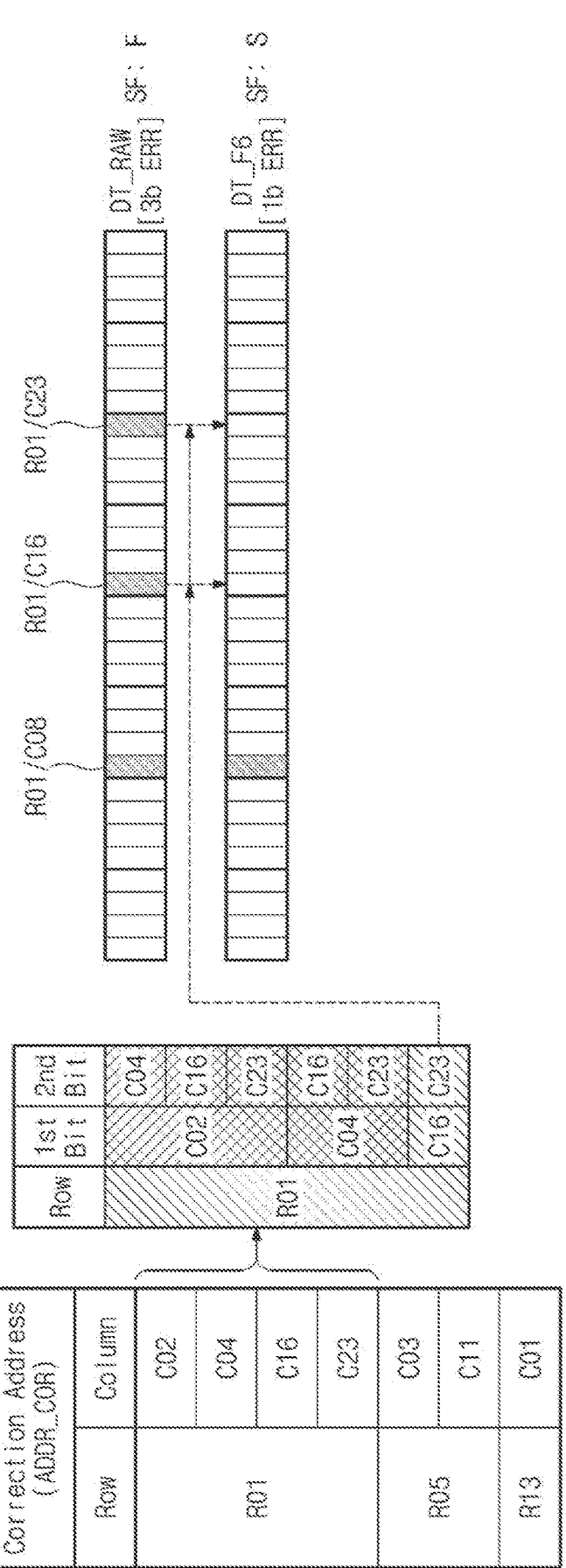

FIGS. 11A and 11B are diagrams for describing an operation of a memory controller according to the flowchart of FIG. 10. Referring to FIGS. 1, 4, 10, 11A, and 11B, the memory controller 110 may read the raw data DT_RAW from the memory device 120 and may perform the error correction operation on the raw data DT_RAW.

In this case, it is assumed that the raw data DT_RAW include three error bits "3b ERR" and the error bits are bits corresponding to the 8th column C08 of the 1st row R01, the 16th column C16 of the 1st row R01, and the 23rd column C23 of the 1st row R01. Also, it is assumed that the ECC engine 111 is capable of correcting one error bit.

As described with reference to FIG. 10, the error manager 112 of the memory controller 110 may select the correction addresses ADDR_COR, based on the number of error bits (i.e., 3) of the raw data DT_RAW and the error correction capability (i.e., 1) of the ECC engine 111. For example, because the raw data DT_RAW include three error bits "3b ERR" and the ECC engine 111 is capable of correcting one error bit, the error manager 112 may select two (i.e., =3–1) of the correction addresses ADDR_COR corresponding to the 1st row R01 from the correction history table CHT. In FIG. 11A, because the number of correction addresses ADDR_COR corresponding to the 1st row R01 is 4, the number of combinations possible for selection of two correction addresses may be 6 ($=_4C_2$).

The error manager 112 of the memory controller 110 may perform the bit flip operation on the raw data DT_RAW, based on a combination of selected correction addresses. In the configuration of FIG. 11A, the error manager 112 of the memory controller 110 may generate the first flip data DT_F1 by selecting the 2nd column C02 of the 1st row R01 and the 4th column C04 of the 1st row R01 for the bit flip operation and performing the bit flip operation on bits corresponding to the 2nd column C02 of the 1st row R01 and the 4th column C04 of the 1st row R01. In this case, the bits of the raw data DT_RAW corresponding to the 2nd column C02 of the 1st row R01 and the 4th column C04 of the 1st row R01 are normal bits, each of the corresponding bits is changed to an error bit through the bit flip operation. Accordingly, the first flip data DT_F1 may include five error bits, and the error of the first flip data DT_F1 may not be corrected by the ECC engine 111.

As in the above description, the memory controller 110 may repeatedly perform the bit flip operation of the raw data DT_RAW and the error correction operation of the flip data with respect to all the correction address combinations or until the error correction of the ECC engine 111 succeeds. For example, as illustrated in FIG. 11B, the memory controller 110 may generate sixth flip data DT_F6 by selecting the 16th column C16 of the 1st row R01 and the 23rd column C23 of the 1st row R01 for the bit flip operation and performing the bit flip operation on bits corresponding to the 16th column C16 of the 1st row R01 and the 23rd column C23 of the 1st row R01. In this case, because the bits of the raw data DT_RAW corresponding to the 16th column C16 of the 1st row R01 and the 23rd column C23 of the 1st row R01 are error bits, the corresponding bits are changed to normal bits through the bit flip operation. Accordingly, the sixth flip data DT_F6 may include one error bit, and the error of the sixth flip data DT_F6 may be corrected by the ECC engine 111.

Address information R01/C08 about the corrected error bit may be added to the correction history table CHT as the correction address ADDR_COR.

In an embodiment, the error manager 112 of the memory controller 110 may select at least one correction address for the bit flip operation based on various schemes. For example, the error manager 112 may select at least one target flip address from the correction history table CHT in an arbitrary order. Alternatively, the error manager 112 may select at least one target correct address from the correction history table CHT in the order of update. Alternatively, the error manager 112 may select at least one target flip address from the correction history table CHT in the order of error occurrence frequency. However, the disclosure is not limited thereto. The target flip address may be selected based on various schemes without departing from the technical idea of the invention.

Figure 12:
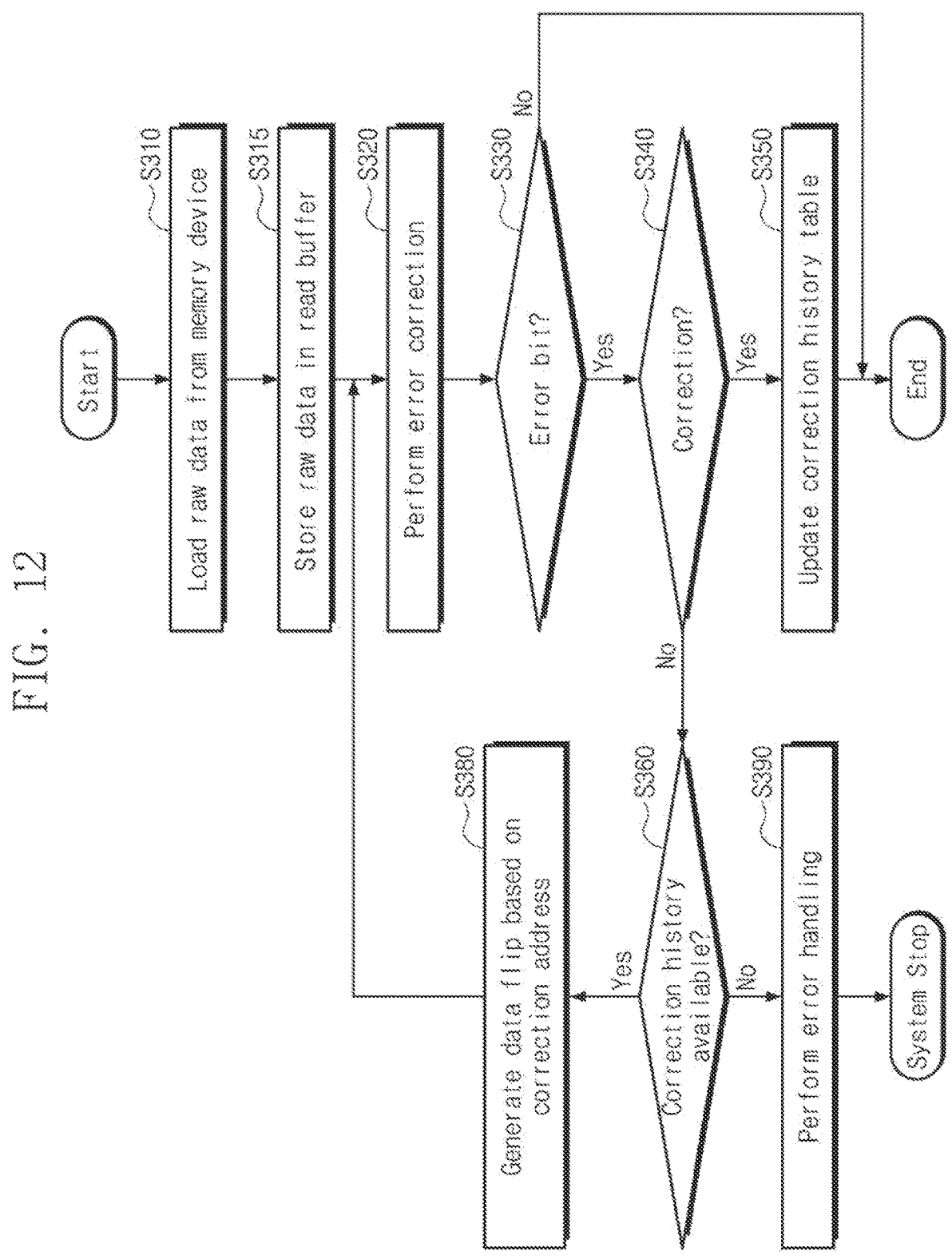
FIG. 12 is a flowchart illustrating an operation of a memory controller of FIG. 1 according to another embodiment of the disclosure.

FIG. 12 is a flowchart illustrating an operation of a memory controller of FIG. 1. Referring to FIGS. 1 and 12, in operation S310, the memory controller 110 may load the raw data DT_RAW from the memory device 120. Operation S310 is similar to operation S110 of FIG. 3, and thus, additional description will be omitted to avoid redundancy.

In operation S315, the memory controller 110 may store the raw data DT_RAW in a read buffer. For example, the memory controller 110 may include the read buffer configured to store the raw data DT_RAW read from the memory device 120.

According to an embodiment, after storing the raw data DT_RAW in the read buffer, the memory controller 110 may perform operation S320, operation S330, operation S340, operation S350, operation S360, operation S380, and operation S390. Operation S320, operation S330, operation S340, operation S350, operation S360, operation S380, and operation S390 are similar to operation S120, operation S130, operation S140, operation S150, operation S160, operation S180, and operation S190 of FIG. 3, and thus, additional description will be omitted to avoid redundancy.

In an embodiment, according to the flowchart of FIG. 12, the memory controller 110 may read the raw data DT_RAW from the memory device 120 and may store the read raw data DT_RAW in the read buffer. Afterwards, the memory controller 110 may perform the bit flip operation by using the raw data DT_RAW stored in the read buffer, without additionally loading the raw data DT_RAW. In this case, because the iterative loading operation of the raw data DT_RAW is omitted, the reduction of performance of the memory system 100 may be prevented.

Figure 13:
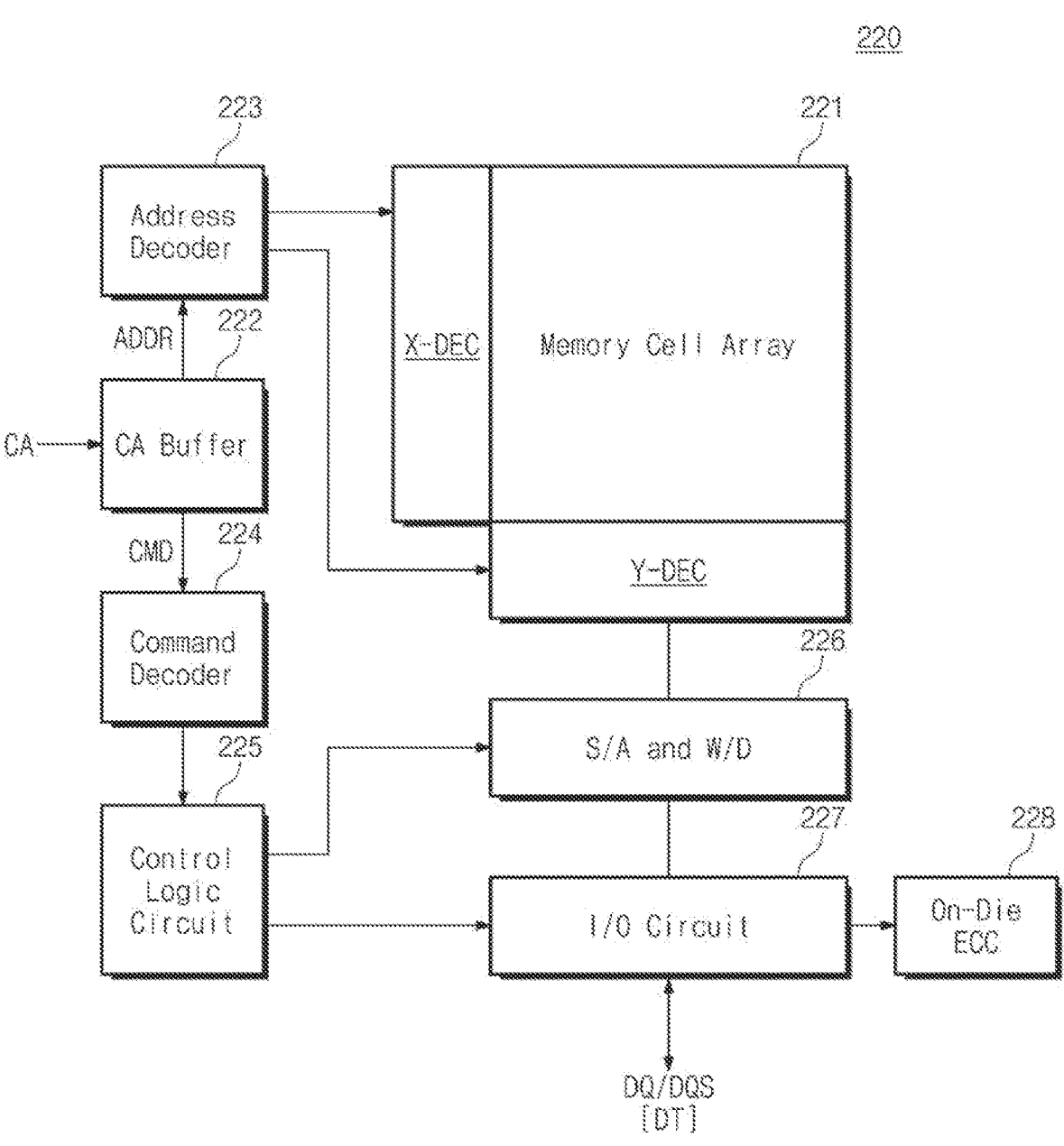
FIG. 13 is a block diagram illustrating a memory device according to another embodiment of the disclosure.

FIG. 13 is a block diagram illustrating a memory device according to an embodiment of the disclosure. Referring to FIG. 13, a memory device 220 may include a memory cell array 221, a CA buffer 222, an address decoder 223, a command decoder 224, a control logic circuit 225, a sense amplifier (S/A) and write driver (W/D) 226, and an input and output (I/O) circuit 227. The components of the memory device 220 are described with reference to FIG. 2, and thus, additional description will be omitted to avoid redundancy.

In an embodiment, the memory device 220 may include an on-die ECC circuit 228. The on-die ECC circuit 228 may be configured to generate parity data associated with data received from the memory controller 110 (illustrated in FIG. 1) or to perform the error correction operation based on the data and the parity data read from the memory cell array 221. That is, the on-die ECC circuit 228 may perform the error correction operation on the data within the memory device 220.

In an embodiment, the on-die ECC circuit 228 may include the ECC engine 111 and the error manager 112 described with reference to FIGS. 1 to 12 and may perform the bit flip operation and the error correction operation based on the operation method described with reference to FIGS. 1 to 12. In an embodiment, operations of the on-die ECC circuit 228 are similar to the operations of the ECC engine 111 and the error manager 112 described above except that the operations of the on-die ECC circuit 228 are performed within the memory device 220, and thus, additional description will be omitted to avoid redundancy.

Figure 14:
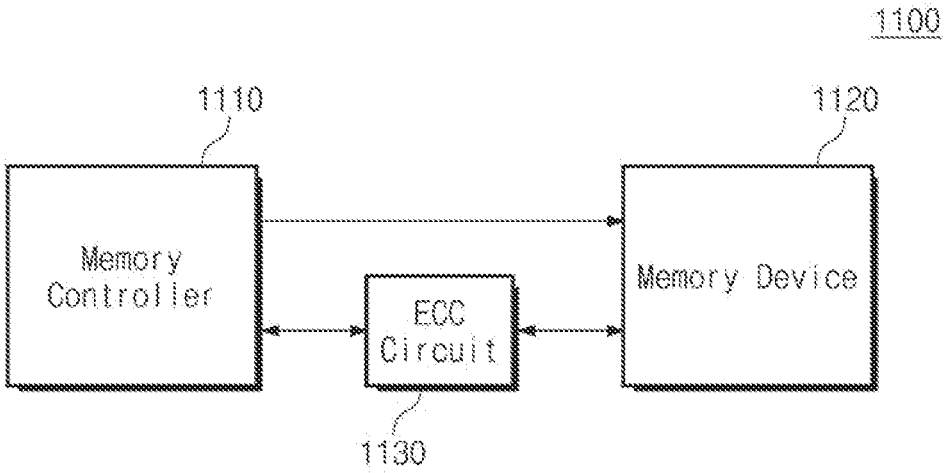
FIG. 14 is a block diagram illustrating a memory system according to another embodiment of the disclosure.

FIG. 14 is a block diagram illustrating a memory system according to an embodiment of the disclosure. Referring to FIG. 14, a memory system 1100 may include a memory controller 1110, a memory device 1120, and an ECC circuit 1130. The memory controller 1110 may store data in the memory device 1120 or may read data stored in the memory device 1120.

In an embodiment, the ECC circuit 1130 may be placed on a data path between the memory controller 1110 and the memory device 1120. The ECC circuit 1130 may be configured to correct an error of data that are exchanged between the memory controller 1110 and the memory device 1120. In an embodiment, the ECC circuit 1130 may include the ECC engine 111 and the error manager 112 described with reference to FIGS. 1 to 12; based on the operation method described with reference to FIGS. 1 to 12, the ECC circuit 1130 may manage the correction history table and may correct an error of data.

Figure 15:
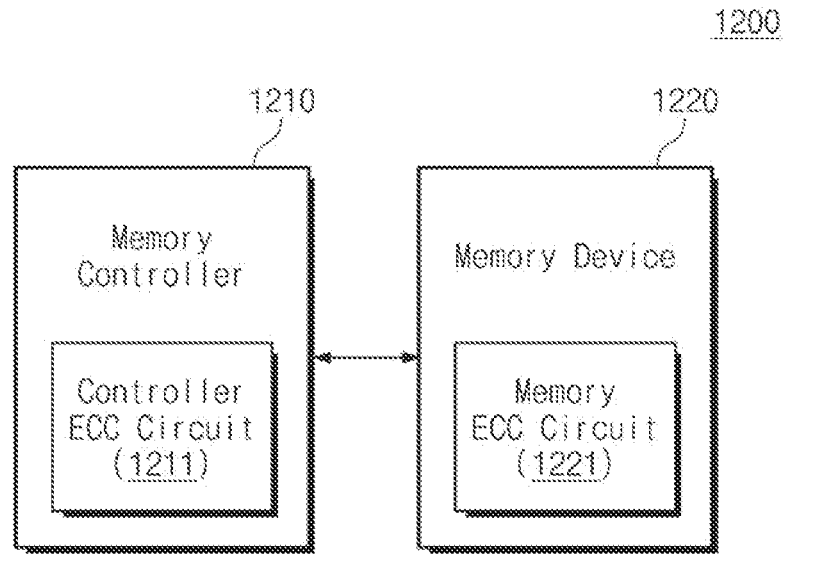
FIG. 15 is a block diagram illustrating a memory system according to another embodiment of the disclosure.

FIG. 15 is a block diagram illustrating a memory system according to an embodiment of the disclosure. Referring to FIG. 15, a memory system 1200 may include a memory controller 1210 and a memory device 1220. The memory controller 1210 may be configured to control the memory device 1220.

The memory controller 1210 may include a controller ECC circuit 1211. The controller ECC circuit 1211 may generate first parity data associated with write data to be stored in the memory device 1220 and may correct an error of the read data based on the read data and the first parity data received from the memory device 1220.

The memory device 1220 may include a memory ECC circuit 1221. The memory ECC circuit 1221 may generate second parity data associated with the write data and the first parity data received from the memory controller 1210 and may correct an error of the read data and the first parity based on the read data, the first parity data, and the second parity data read from the memory device 1220.

In an embodiment, each of the controller ECC circuit 1211 and the memory ECC circuit 1221 may include the ECC engine 111 and the error manager 112 described with reference to FIGS. 1 to 12 and may operate based on the method described with reference to FIGS. 1 to 12.

Figure 16:
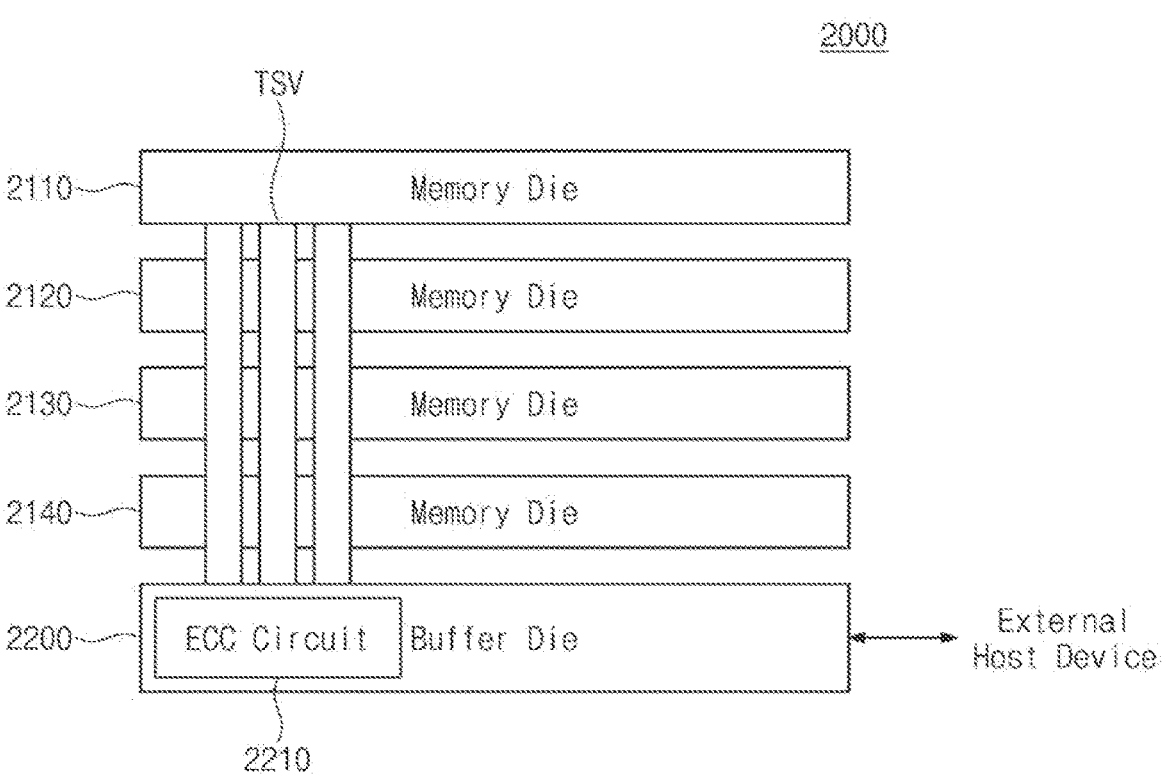
FIG. 16 is a diagram illustrating an example of a memory package according to an embodiment of the disclosure.

FIG. 16 is a diagram illustrating an example of a memory package according to an embodiment of the disclosure. Referring to FIG. 16, a memory package 2000 may include a plurality of memory dies 2110, 2120, 2130, and 2140 and a buffer die 2200. Each of the plurality of memory dies 2110, 2120, 2130, and 2140 may be a DRAM device. The plurality of memory dies 2110, 2120, 2130, and 2140 and the buffer die 2200 may be implemented in a stacked structure, may be electrically connected to each other through the TSV (through silicon via), and may communicate with each other.

In an embodiment, the memory package 2000 may be provided as one semiconductor package through packaging by the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), or wafer-level processed stack package (WSP).

The buffer die 2200 may communicate with an external host device (or a memory controller). The buffer die 2200 may be configured to temporarily store data to be written in the plurality of memory dies 2110, 2120, 2130, and 2140 or to temporarily store data read from the plurality of memory dies 2110, 2120, 2130, and 2140. In an embodiment, the buffer die 2200 may include an ECC circuit 2210. The ECC circuit 2210 may generate parity data associated with data to be stored in the memory dies 2110, 2120, 2130, and 2140 or may correct an error of the data read from the memory dies 2110, 2120, 2130, and 2140. In an embodiment, the ECC circuit 2210 may include the ECC engine 111 and the error manager 112 described with reference to FIGS. 1 to 12 or may operate based on the method described with reference to FIGS. 1 to 12.

Figure 17:
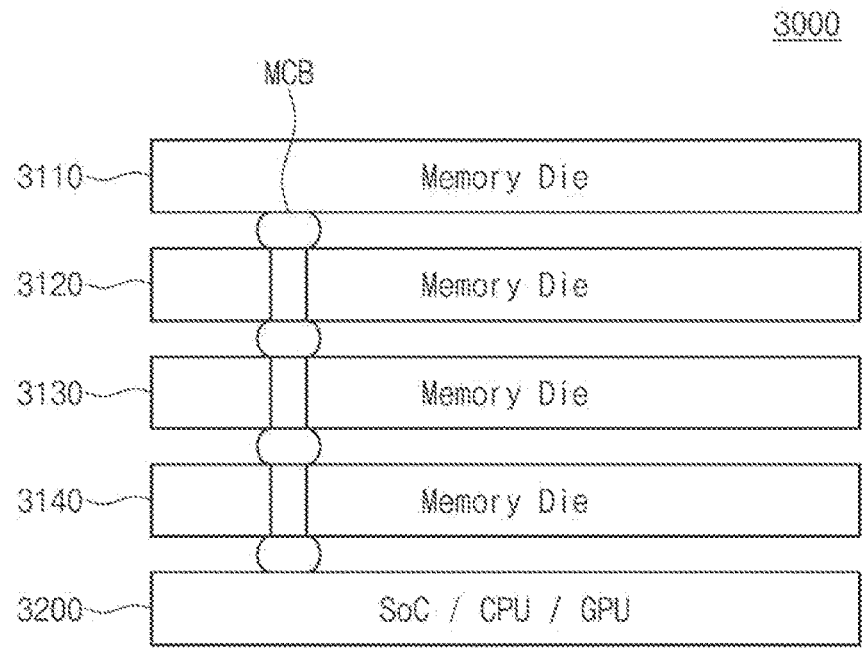
FIG. 17 is a diagram illustrating an example of a memory package according to an embodiment of the disclosure.

FIG. 17 is a diagram illustrating an example of a memory package according to an embodiment of the disclosure. Referring to FIG. 17, a memory package 3000 may include a plurality of memory dies 3110, 3120, 3130, and 3140 and a host die 3200. The plurality of memory dies 3110, 3120, 3130, and 3140 may be electrically connected to each other through micro bumps MCB, may have a stacked structure, and may be directly stacked on the host die 3200. The host die 3200 may be a SoC, a CPU, or a GPU. In an embodiment, each of the plurality of memory dies 3110, 3120, 3130, and 3140 or the host die 3200 may include the ECC engine 111 and the error manager 112 described with reference to FIGS. 1 to 12 or may operate based on the operation method described with reference to FIGS. 1 to 12.

Figure 18:
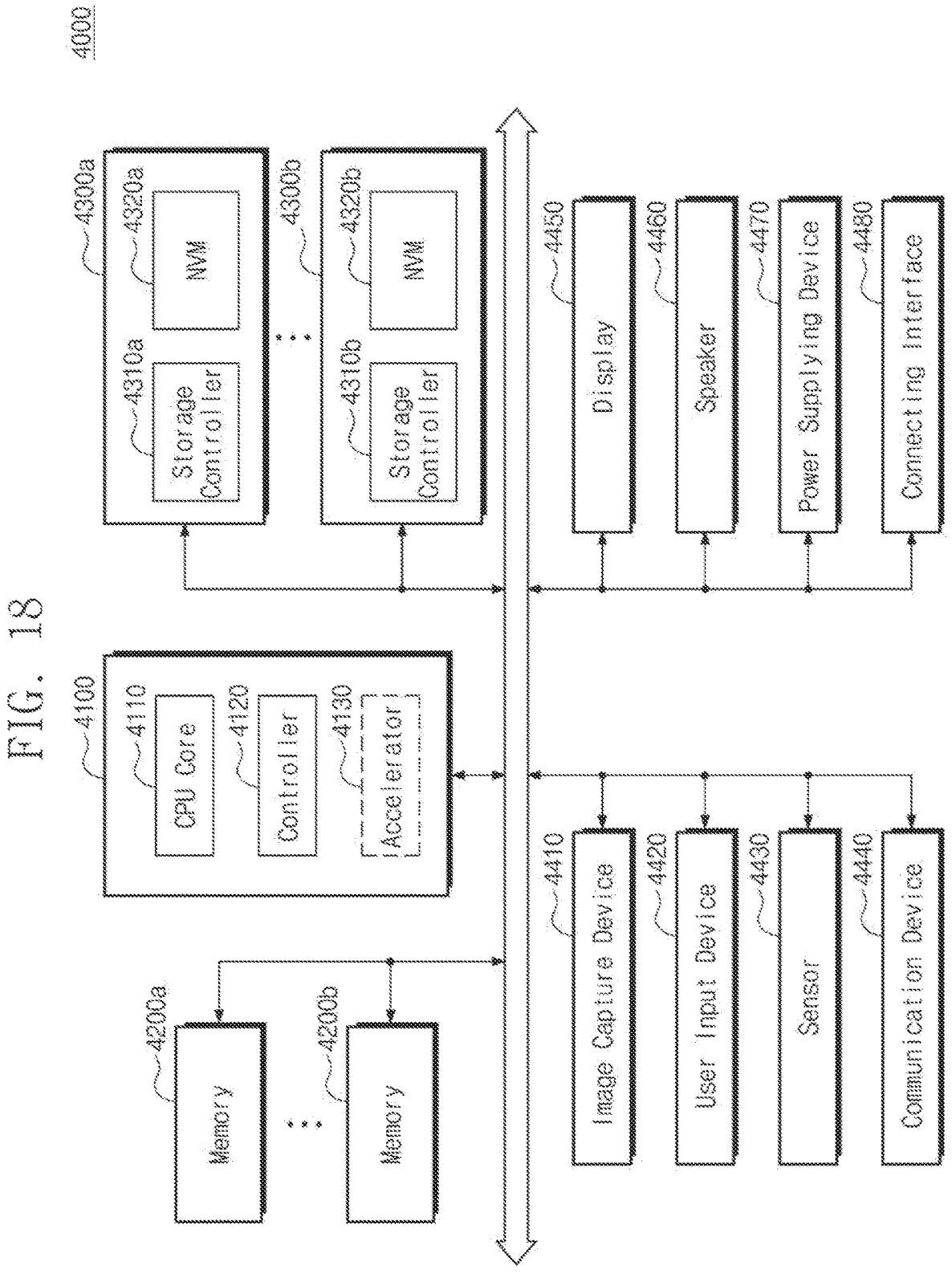
FIG. 18 is a diagram illustrating a system to which a storage device according to an embodiment of the disclosure is applied.

FIG. 18 is a diagram of a system 4000 to which a storage device is applied, according to an embodiment. The system 4000 of FIG. 18 may basically be a mobile system, such as a portable communication terminal (e.g., a mobile phone), a smartphone, a tablet personal computer (PC), a wearable device, a healthcare device, or an Internet of things (IOT) device. However, the system 4000 of FIG. 18 is not necessarily limited to the mobile system and may be a PC, a laptop computer, a server, a media player, or an automotive device (e.g., a navigation device).

Referring to FIG. 18, the system 4000 may include a main processor 4100, memories (e.g., 4200a and 4200b), and storage devices (e.g., 4300a and 4300b). In addition, the system 4000 may include at least one of an image capturing device 4410, a user input device 4420, a sensor 4430, a communication device 4440, a display 4450, a speaker 4460, a power supplying device 4470, and a connecting interface 4480.

The main processor 4100 may control some or all operations of the system 4000. For example, the main processor 4100 may control operations of other components included in the system 4000. The main processor 4100 may be implemented as a general-purpose processor, a dedicated processor, or an application processor.

The main processor 4100 may include at least one CPU core 4110 and further include a controller 4120 configured to control the memories 4200a and 4200b and/or the storage devices 4300a and 4300b. In some embodiments, the main processor 4100 may further include an accelerator 4130, which is a dedicated circuit for a high-speed data operation, such as an artificial intelligence (AI) data operation. The accelerator 4130 may include a graphics processing unit (GPU), a neural processing unit (NPU) and/or a data processing unit (DPU) and be implemented as a chip that is physically separate from the other components of the main processor 4100.

The memories 4200a and 4200b may be used as main memory devices of the system 1000. Although each of the memories 4200a and 4200b may include a volatile memory, such as static random access memory (SRAM) and/or dynamic RAM (DRAM), each of the memories 4200a and 4200b may include non-volatile memory, such as a flash memory, phase-change RAM (PRAM) and/or resistive RAM (RRAM). The memories 4200a and 4200b may be implemented in the same package as the main processor 4100.

The storage devices 4300a and 4300b may serve as non-volatile storage devices configured to store data regardless of whether power is supplied thereto, and have larger storage capacity than the memories 4200a and 4200b. The storage devices 4300a and 4300b may respectively include storage controllers (STRG CTRL) 4310a and 4310b and NVM (Non-Volatile Memory)s 4320a and 4320b configured to store data via the control of the storage controllers 4310a and 4310b. Although the NVMs 4320a and 4320b may include flash memories having a two-dimensional (2D) structure or a three-dimensional (3D) V-NAND structure, the NVMs 4320a and 4320b may include other types of NVMs, such as PRAM and/or RRAM.

The storage devices 4300a and 4300b may be physically separated from the main processor 4100 and included in the system 4000 or implemented in the same package as the main processor 4100. In addition, the storage devices 4300a and 4300b may have types of solid-state devices (SSDs) or memory cards and be removably combined with other components of the system 4000 through an interface, such as the connecting interface 4480 that will be described below. The storage devices 4300a and 4300b may be devices to which a standard protocol, such as a universal flash storage (UFS), an embedded multi-media card (eMMC), or a non-volatile memory express (NVMe), is applied, without being limited thereto.

The image capturing device 4410 may capture still images or moving images. The image capturing device 4410 may include a camera, a camcorder, and/or a webcam.

The user input device 4420 may receive various types of data input by a user of the system 4000 and include a touch pad, a keypad, a keyboard, a mouse, and/or a microphone.

The sensor 4430 may detect various types of physical quantities, which may be obtained from the outside of the system 4000, and convert the detected physical quantities into electric signals. The sensor 4430 may include a temperature sensor, a pressure sensor, an illuminance sensor, a position sensor, an acceleration sensor, a biosensor, and/or a gyroscope sensor.

The communication device 4440 may transmit and receive signals between other devices outside the system 4000 according to various communication protocols. The communication device 4440 may include an antenna, a transceiver, and/or a modem.

The display 4450 and the speaker 4460 may serve as output devices configured to respectively output visual information and auditory information to the user of the system 4000.

The power supplying device 4470 may appropriately convert power supplied from a battery embedded in the system 4000 and/or an external power source, and supply the converted power to each of components of the system 4000.

The connecting interface 4480 may provide connection between the system 4000 and an external device, which is connected to the system 4000 and capable of transmitting and receiving data to and from the system 4000. The connecting interface 4480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the main processor 4100 may include the memory controller 110 described with reference to FIGS. 1 to 12. That is, the main processor 4100 may be configured to correct an error of data stored in the memories 4200a to 4200b based on the operation method described with reference to FIGS. 1 to 12. In an embodiment, each of the memories 4200a to 4200b may include the ECC engine 111 and the error manager 112 described with reference to FIGS. 1 to 12 and may correct an error of data based on the operation method described with reference to FIGS. 1 to 12.

Figure 19:
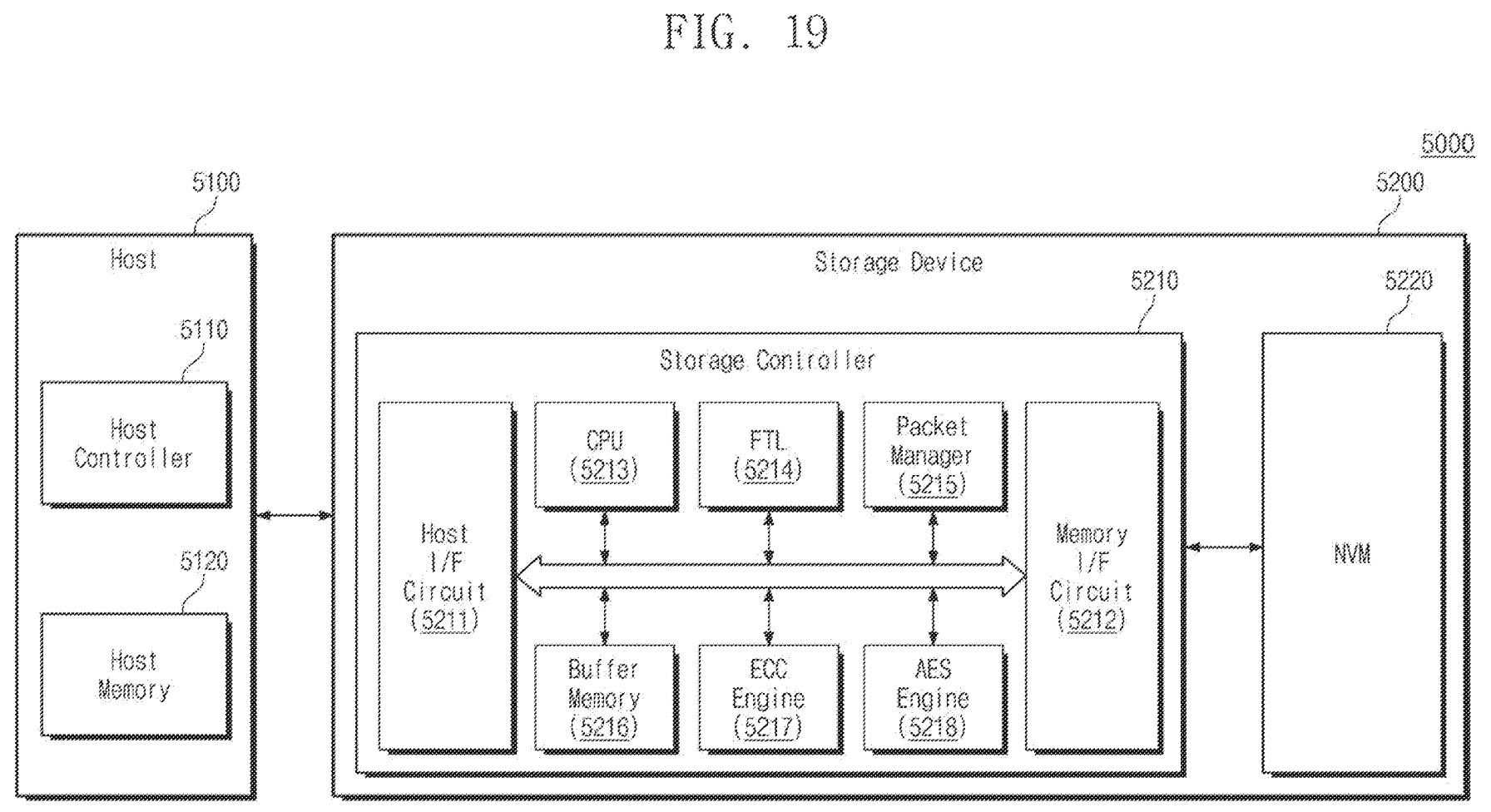

FIG. 19 is a block diagram of a host storage system 5000 according to an example embodiment.

The host storage system 5000 may include a host 5100 and a storage device 5200. Further, the storage device 5200 may include a storage controller 5210 and an NVM 5220. According to an example embodiment, the host 5100 may include a host controller 5110 and a host memory 5120. The host memory 5120 may serve as a buffer memory configured to temporarily store data to be transmitted to the storage device 5200 or data received from the storage device 5200.

The storage device 5200 may include storage media configured to store data in response to requests from the host 5100. As an example, the storage device 5200 may include at least one of an SSD, an embedded memory, and a removable external memory. When the storage device 5200 is an SSD, the storage device 5200 may be a device that conforms to an NVMe standard. When the storage device 5200 is an embedded memory or an external memory, the storage device 5200 may be a device that conforms to a UFS standard or an eMMC standard. Each of the host 5100 and the storage device 5200 may generate a packet according to an adopted standard protocol and transmit the packet.

When the NVM 5220 of the storage device 5200 includes a flash memory, the flash memory may include a 2D NAND memory array or a 3D (or vertical) NAND (VNAND) memory array. As another example, the storage device 5200 may include various other kinds of NVMs. For example, the storage device 5200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 5110 and the host memory 5120 may be implemented as separate semiconductor chips. Alternatively, in some embodiments, the host controller 5110 and the host memory 5120 may be integrated in the same semiconductor chip. As an example, the host controller 5110 may be any one of a plurality of modules included in an application processor (AP). The AP may be implemented as a System on Chip (SoC). Further, the host memory 5120 may be an embedded memory included in the AP or an NVM or memory module located outside the AP.

The host controller 5110 may manage an operation of storing data (e.g., write data) of a buffer region of the host memory 5120 in the NVM 5220 or an operation of storing data (e.g., read data) of the NVM 5220 in the buffer region.

The storage controller 5210 may include a host interface (I/F) 5211, a memory interface 5212, and a CPU 5213. Further, the storage controllers 5210 may further include a flash translation layer (FTL) 5214, a packet manager 5215, a buffer memory 5216, an error correction code (ECC) engine 5217, and an advanced encryption standard (AES) engine 5218. The storage controllers 5210 may further include a working memory in which the FTL 5214 is loaded. The CPU 5213 may execute the FTL 5214 to control data write and read operations on the NVM 5220.

The host interface 5211 may transmit and receive packets to and from the host 5100. A packet transmitted from the host 5100 to the host interface 5211 may include a command or data to be written to the NVM 5220. A packet transmitted from the host interface 5211 to the host 5100 may include a response to the command or data read from the NVM 5220.

The memory interface 5212 may transmit data to be written to the NVM 5220 to the NVM 5220 or receive data read from the NVM 5220. The memory interface 5212 may be configured to comply with a standard protocol, such as Toggle or open NAND flash interface (ONFI).

The FTL 5214 may perform various functions, such as an address mapping operation, a wear-leveling operation, and a garbage collection operation. The address mapping operation may be an operation of converting a logical address received from the host 5100 into a physical address used to actually store data in the NVM 5220. The wear-leveling operation may be a technique for preventing excessive deterioration of a specific block by allowing blocks of the NVM 5220 to be uniformly used. As an example, the wear-leveling operation may be implemented using a firmware technique that balances erase counts of physical blocks. The garbage collection operation may be a technique for ensuring usable capacity in the NVM 5220 by erasing an existing block after copying valid data of the existing block to a new block.

The packet manager 5215 may generate a packet according to a protocol of an interface, which consents to the host 5100, or parse various types of information from the packet received from the host 5100. In addition, the buffer memory 5216 may temporarily store data to be written to the NVM 5220 or data to be read from the NVM 5220. Although the buffer memory 5216 may be a component included in the storage controllers 5210, the buffer memory 5216 may be outside the storage controllers 5210.

The ECC engine 5217 may perform error detection and correction operations on read data read from the NVM 5220. More specifically, the ECC engine 5217 may generate parity bits for write data to be written to the NVM 5220, and the generated parity bits may be stored in the NVM 5220 together with write data. During the reading of data from the NVM 5220, the ECC engine 5217 may correct an error in the read data by using the parity bits read from the NVM 5220 along with the read data, and output error-corrected read data.

The AES engine 5218 may perform at least one of an encryption operation and a decryption operation on data input to the storage controllers 5210 by using a symmetric-key algorithm.

In an embodiment, the buffer memory 5216 may be placed outside the storage controller 5210 and may be the memory device or the DRAM device described with reference to FIGS. 1 to 12. The storage controller 5210 may include the ECC engine 111 and the error manager 112 described with reference to FIGS. 1 to 12 and may configured to correct an error of data read from the buffer memory 5216 based on the operation method described with reference to FIGS. 1 to 12.

In an embodiment, the storage controller 5210 may manage the correction history table CHT of the buffer memory 5216, based on the method described of the reference to FIGS. 1 to 12. In an embodiment, when the storage device 5200 is powered off, the correction history table CHT that is managed by the storage controller 5210 may be flushed to the nonvolatile memory 5220; when the storage device 5200 is powered on, the correction history table CHT may be loaded from the nonvolatile memory 5220 to the storage controller 5210.

Figure 20:
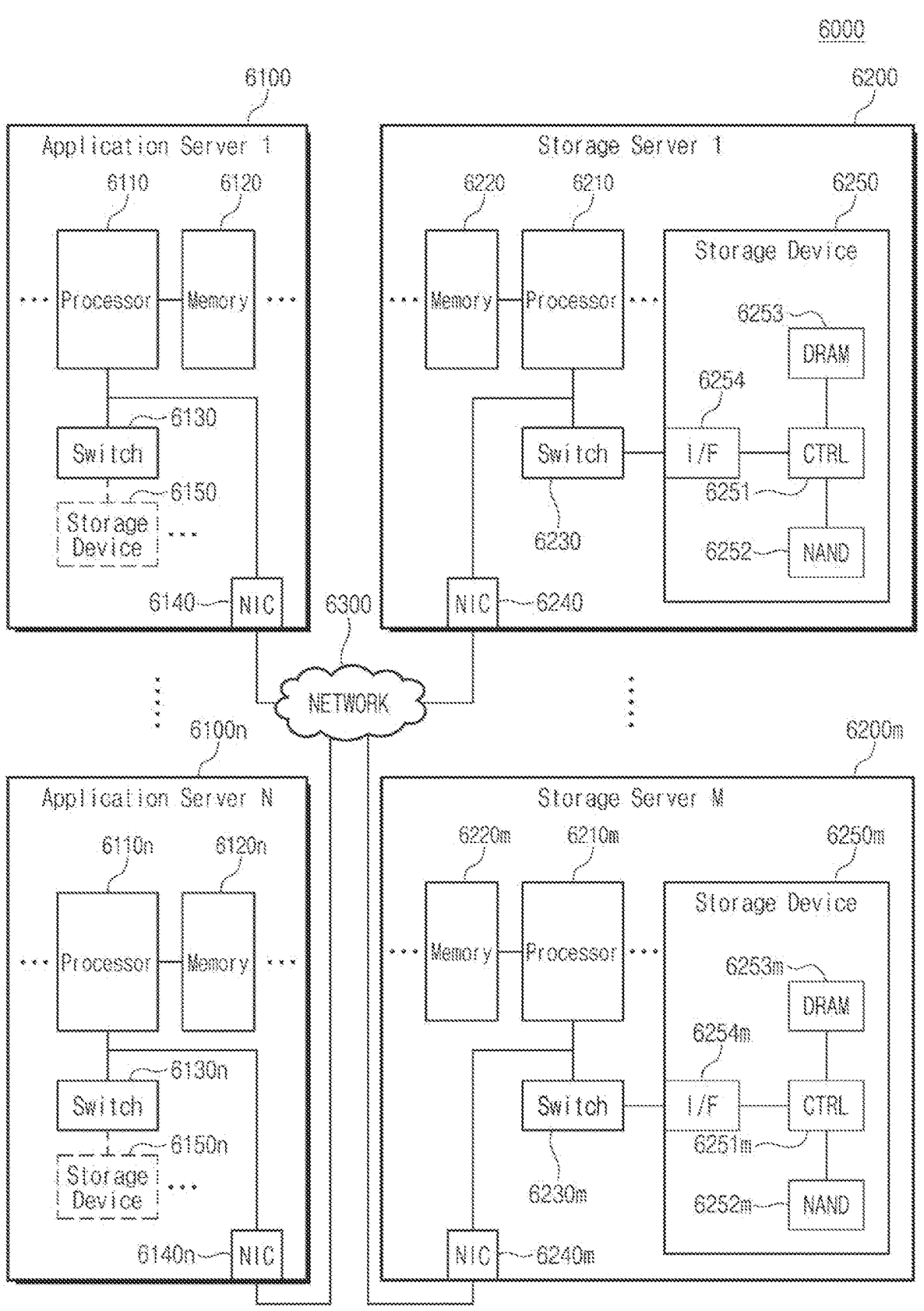
FIG. 20 is a diagram illustrating a data center to which a memory device according to an embodiment of the disclosure is applied.

FIG. 20 is a diagram of a data center 6000 to which a memory device is applied, according to an embodiment.

Referring to FIG. 20, the data center 6000 may be a facility that collects various types of pieces of data and provides services and be referred to as a data storage center.

The data center 6000 may be a system for operating a search engine and a database, and may be a computing system used by companies, such as banks, or government agencies. The data center 6000 may include application servers 6100 to 6100n and storage servers 6200 to 6200m. The number of application servers 6100 to 6100n and the number of storage servers 6200 to 6200m may be variously selected according to embodiments. The number of application servers 6100 to 6100n may be different from the number of storage servers 6200 to 6200m.

The application server 6100 or the storage server 6200 may include at least one of processors 6110 and 6210 and memories 6120 and 6220. The storage server 6200 will now be described as an example. The processor 6210 may control all operations of the storage server 6200, access the memory 6220, and execute instructions and/or data loaded in the memory 6220. The memory 6220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 6210 and memories 6220 included in the storage server 6200 may be variously selected. In an embodiment, the processor 6210 and the memory 6220 may provide a processor-memory pair. In an embodiment, the number of processors 6210 may be different from the number of memories 6220. The processor 6210 may include a single-core processor or a multi-core processor. The above description of the storage server 6200 may be similarly applied to the application server 6100. In some embodiments, the application server 6100 may not include a storage device 6150. The storage server 6200 may include at least one storage device 6250. The number of storage devices 6250 included in the storage server 6200 may be variously selected according to embodiments.

The application servers 6100 to 6100n may communicate with the storage servers 6200 to 6200m through a network 6300. The network 6300 may be implemented by using a fiber channel (FC) or Ethernet. In this case, the FC may be a medium used for relatively high-speed data transmission and use an optical switch with high performance and high availability. The storage servers 6200 to 6200m may be provided as file storages, block storages, or object storages according to an access method of the network 6300.

In an embodiment, the network 6300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 6300 may be a general network, such as a TCP/IP network. For example, the network 6300 may be implemented according to a protocol, such as FC over Ethernet (FCoE), network attached storage (NAS), and NVMe over Fabrics (NVMe-oF).

Hereinafter, the application server 6100 and the storage server 6200 will mainly be described. A description of the application server 6100 may be applied to another application server 6100n, and a description of the storage server 6200 may be applied to another storage server 6200m.

The application server 6100 may store data, which is requested by a user or a client to be stored, in one of the storage servers 6200 to 6200m through the network 6300. Also, the application server 6100 may obtain data, which is requested by the user or the client to be read, from one of the storage servers 6200 to 6200m through the network 6300. For example, the application server 6100 may be implemented as a web server or a database management system (DBMS).

The application server 6100 may access a memory 6120n or a storage device 6150n, which is included in another application server 6100n, through the network 6300. Alternatively, the application server 6100 may access memories 6220 to 6220m or storage devices 6250 to 6250m, which are included in the storage servers 6200 to 6200m, through the network 6300. Thus, the application server 6100 may perform various operations on data stored in application servers 6100 to 6100n and/or the storage servers 6200 to 6200m. For example, the application server 6100 may execute an instruction for moving or copying data between the application servers 6100 to 6100n and/or the storage servers 6200 to 6200m. In this case, the data may be moved from the storage devices 6250 to 6250m of the storage servers 6200 to 6200m to the memories 6120 to 6120n of the application servers 6100 to 6100n directly or through the memories 6220 to 6220m of the storage servers 6200 to 6200m. The data moved through the network 6300 may be data encrypted for security or privacy.

The storage server 6200 will now be described as an example. An interface 6254 may provide physical connection between a processor 6210 and a controller 6251 and a physical connection between a network interface card (NIC) 6240 and the controller 6251. For example, the interface 6254 may be implemented using a direct attached storage (DAS) scheme in which the storage device 6250 is directly connected with a dedicated cable. For example, the interface 6254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 6200 may further include a switch 6230 and the NIC (Network InterConnect) 6240. The switch 6230 may selectively connect the processor 6210 to the storage device 6250 or selectively connect the NIC 6240 to the storage device 6250 via the control of the processor 6210.

In an embodiment, the NIC 6240 may include a network interface card and a network adaptor. The NIC 6240 may be connected to the network 6300 by a wired interface, a wireless interface, a Bluetooth interface, or an optical interface. The NIC 6240 may include an internal memory, a digital signal processor (DSP), and a host bus interface and be connected to the processor 6210 and/or the switch 6230 through the host bus interface. The host bus interface may be implemented as one of the above-described examples of the interface 6254. In an embodiment, the NIC 6240 may be integrated with at least one of the processor 6210, the switch 6230, and the storage device 6250.

In the storage servers 6200 to 6200m or the application servers 6100 to 6100n, a processor may transmit a command to storage devices 6150 to 6150n and 6250 to 6250m or the memories 6120 to 6120n and 6220 to 6220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 6150 to 6150*n* and 6250 to 6250*m* may transmit a control signal and a command/address signal to NAND flash memory devices 6252 to 6252*m* in response to a read command received from the processor. Thus, when data is read from the NAND flash memory devices 6252 to 6252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 6251 may control all operations of the storage device 6250. In an embodiment, the controller 6251 may include SRAM. The controller 6251 may write data to the NAND flash memory device 6252 in response to a write command or read data from the NAND flash memory device 6252 in response to a read command. For example, the write command and/or the read command may be provided from the processor 6210 of the storage server 6200, the processor 6210*m* of another storage server 6200*m*, or the processors 6110 and 6110*n* of the application servers 6100 and 6100*n*. DRAM 6253 may temporarily store (or buffer) data to be written to the NAND flash memory device 6252 or data read from the NAND flash memory device 6252. Also, the DRAM 6253 may store metadata. Here, the metadata may be user data or data generated by the controller 6251 to manage the NAND flash memory device 6252. The storage device 6250 may include a secure element (SE) for security or privacy.

In an embodiment, each of the processors 6110 to 6110*n* and 6210 to 6210*m* included in the application servers 6100 to 6100*n* and the storage servers 6200 to 6200*m* may include the memory controller described with reference to FIGS. 1 to 12 and may be configured to correct an error of data stored in the memories 6120 to 6120*n* and 6220 to 6220*m* included in the application servers 6100 to 6100*n* and the storage servers 6200 to 6200*m*, based on the operation method described with reference to FIG. 12. In an embodiment, a processor (e.g., 6110) included in one of the application servers 6100 to 6100*n* and the storage servers 6200 to 6200*m* may correct and manage an error of data stored in a memory (e.g., 6220) included in another of the application servers 6100 to 6100*n* and the storage servers 6200 to 6200*m*, based on the method described with reference to FIGS. 1 to 12.

According to the disclosure, when an error of raw data read from a memory device is not corrected, a memory controller may generate flip data by performing a bit flip operation on the raw data based on a correction history table and may perform an error correction operation on the generated flip data. In this case, even though the number of error bits of the raw data exceeds an error correction level of an error correction code (ECC) engine, error bits of a given level may be flipped through the bit flip operation. Through the bit flip operation, the number of error bits of the flip data may be decreased below the error correction level of the ECC engine, and thus, normal error correction for data is possible. Accordingly, an operation method of a memory controller configured to control a memory device with improved reliability is provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A method of operating a memory controller configured to control a memory device, the method comprising:
   loading data from the memory device;
   performing a first error correction operation on the data;
   based on an error in the data not being corrected through the first error correction operation, generating first flip data by performing a first bit flip operation on the data based on a correction history information; and
   performing a second error correction operation on the first flip data,
   wherein the correction history information comprises one or more correction addresses indicating locations of one or more memory cells in the memory device, which are associated with previously corrected error bits.

2. The method of claim 1, wherein the generating of the first flip data comprises:
   selecting a first target address among the one or more correction addresses corresponding to a row address of the data from the correction history information; and
   generating the first flip data by flipping a bit of the data, which corresponds to the first target address.

3. The method of claim 2, wherein the correction history information comprises one or more count information each corresponding to the one or more correction addresses, and wherein each of the one or more count information indicates a number of times a bit corresponding to a respective one of the one or more correction addresses is corrected.

4. The method of claim 3, wherein the first target address is a first correction address, among the one or more correction addresses corresponding to the row address of the data, the first correction address associated with a largest count value, among the one or more count information.

5. The method of claim 2, wherein, when the number of error bits of the data is N and the number of error bits correctable by the memory controller is K, the first target address corresponds to (N−K) bits of the data, and wherein N and K are natural numbers.

6. The method of claim 1, wherein the generating of the first flip data comprises:
   reloading the data from the memory device; and
   generating the first flip data by performing the first bit flip operation on the reloaded data.

7. The method of claim 1, wherein the data loaded from the memory device are stored in a read buffer of the memory controller, and
   wherein the generating of the first flip data comprises:
   generating the first flip data by performing the first bit flip operation on the data stored in the read buffer based on the correction history information.

8. The method of claim 1, further comprising:
   when an error of the first flip data is not corrected through the second error correction operation, generating second flip data by performing a second bit flip operation on the data based on the correction history information; and
   performing a third error correction operation on the second flip data.

9. The method of claim 8, wherein, in the data, bits flipped through the first bit flip operation are different from bits flipped through the second bit flip operation.

10. The method of claim 8, further comprising:
   when an error of the second flip data is not corrected by the third error correction operation, performing an error handling operation.

11. The method of claim 1, further comprising:

when an error of the first flip data is corrected, updating the correction history information based on a correction address associated with a location of an error bit corrected in the first flip data.

12. The method of claim 1, further comprising:

storing the correction history information as a correction history table in an external nonvolatile memory.

13. The method of claim 1, wherein the memory device is a dynamic random access memory (DRAM) device.

14. A method of operating a memory controller configured to control a memory device, the method comprising:

loading first data from the memory device;

performing a first error correction operation on the first data;

updating a correction history information based on a first address corresponding to an error bit corrected in the first data;

loading second data having a row address identical to a row address of the first data from the memory device;

performing a second error correction operation on the second data;

based on an error of the second data not being corrected, generating first flip data by flipping a bit of the second data, which corresponds to the first address, based on the correction history information; and performing a second error correction operation on the first flip data.

15. The method of claim 14, wherein the generating of the first flip data comprises:

reloading the second data from the memory device; and generating the first flip data by flipping a bit of the reloaded second data, which corresponds to the first address.

16. The method of claim 14, further comprising:

when an error of the first flip data is corrected through the second error correction operation, updating the correction history information based on a second address corresponding to an error bit corrected in the first flip data.

17. A method of operating a memory controller configured to control a memory device, the method comprising:

loading data from the memory device;

performing a first error correction operation on the data;

based on an error in the data not being corrected through the first error correction operation, generating first flip data by flipping at least one first bit among a plurality of bits of the data based on correction history information related to error corrected bits of a memory cell; and performing a second error correction operation on the first flip data.

18. The method of claim 17, further comprising:

when an error of the first flip data is not corrected through the second error correction operation, generating second flip data by flipping at least one second bit among the plurality of bits of the data; and performing a third error correction operation on the second flip data.

19. The method of claim 17, wherein the at least one first bit flipped from among the plurality of bits of the data is selected based on the correction history information, and wherein the correction history information comprises an address of the memory cell corresponding to a bit of an error-corrected memory cell among memory cells of the memory device, which stores the data.

20. The method of claim 19, further comprising:

when an error of the first flip data is corrected, updating the correction history information based on information about a corrected error bit of the first flip data.

* * * * *